United States Patent
Höglund et al.

(10) Patent No.: US 11,368,936 B2
(45) Date of Patent: Jun. 21, 2022

(54) UNEVEN PAGING LOAD DISTRIBUTION FOR NARROWBAND

(71) Applicant: TELEFONAKTIEBOLAGET LM ERICSSON (PUBL), Stockholm (SE)

(72) Inventors: Andreas Höglund, Solna (SE); Ali Nadar, Malmö (SE); Béla Rathonyi, Lomma (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 515 days.

(21) Appl. No.: 16/323,360

(22) PCT Filed: Aug. 3, 2017

(86) PCT No.: PCT/IB2017/054771
§ 371 (c)(1),
(2) Date: Feb. 5, 2019

(87) PCT Pub. No.: WO2018/025225
PCT Pub. Date: Feb. 8, 2018

(65) Prior Publication Data
US 2021/0297984 A1    Sep. 23, 2021

Related U.S. Application Data

(60) Provisional application No. 62/371,347, filed on Aug. 5, 2016.

(51) Int. Cl.
*H04W 68/02* (2009.01)
*H04W 72/04* (2009.01)

(52) U.S. Cl.
CPC ....... *H04W 68/02* (2013.01); *H04W 72/0486* (2013.01)

(58) Field of Classification Search
CPC ... H04W 68/00; H04W 68/02; H04W 68/005; H04W 52/0216; H04W 76/28; H04W 28/08
See application file for complete search history.

(56) References Cited

U.S. PATENT DOCUMENTS

2015/0319742 A1* 11/2015 Koivisto ............... H04L 5/0053
370/329
2015/0365941 A1   12/2015 Liu et al.
(Continued)

FOREIGN PATENT DOCUMENTS

EP    2077641 A2    7/2009
WO    2011123510 A1   10/2011
(Continued)

OTHER PUBLICATIONS

Etsi Etsi: "TS 136213" May 1, 2016 (May 1, 2016), pp. 2016-5, XP055428208.

*Primary Examiner* — Dung Hong

(57) ABSTRACT

According to some embodiments, a method for use in a user equipment (UE) comprises receiving a plurality of weights for assigning paging physical resource blocks (PRBs) to a plurality of UEs. Each weight is associated with a respective paging PRB. The method further comprises determining a paging PRB for the UE using at least one weight of the plurality of weights, and receiving paging on the determined paging PRB. In particular embodiments, determining the paging PRB for the UE comprises assigning the UE to an artificial paging PRB of a set of artificial paging PRBs, and mapping the artificial paging PRB to an actual paging PRB of a set of actual paging PRBs using at least one weight of the plurality of weights. The set of actual paging PRBs includes a smaller number of paging PRBs than the set of artificial paging PRBs.

18 Claims, 11 Drawing Sheets

(56) References Cited

U.S. PATENT DOCUMENTS

2018/0020432 A1* 1/2018 Rico Alvarino .... H04W 72/048
2019/0182822 A1* 6/2019 Takeda ................. H04W 68/00

FOREIGN PATENT DOCUMENTS

WO     2014067149 A1    5/2014
WO     2018/017201 A1   1/2018

* cited by examiner

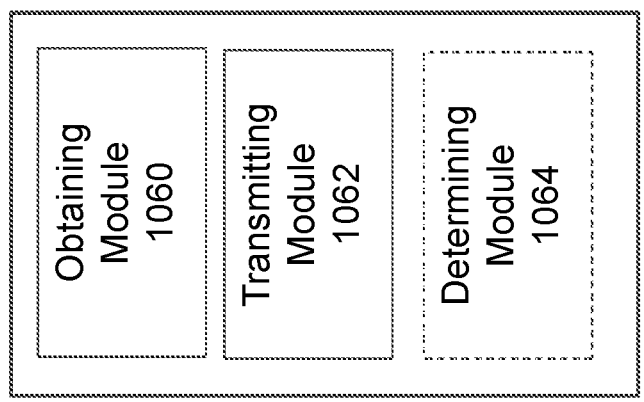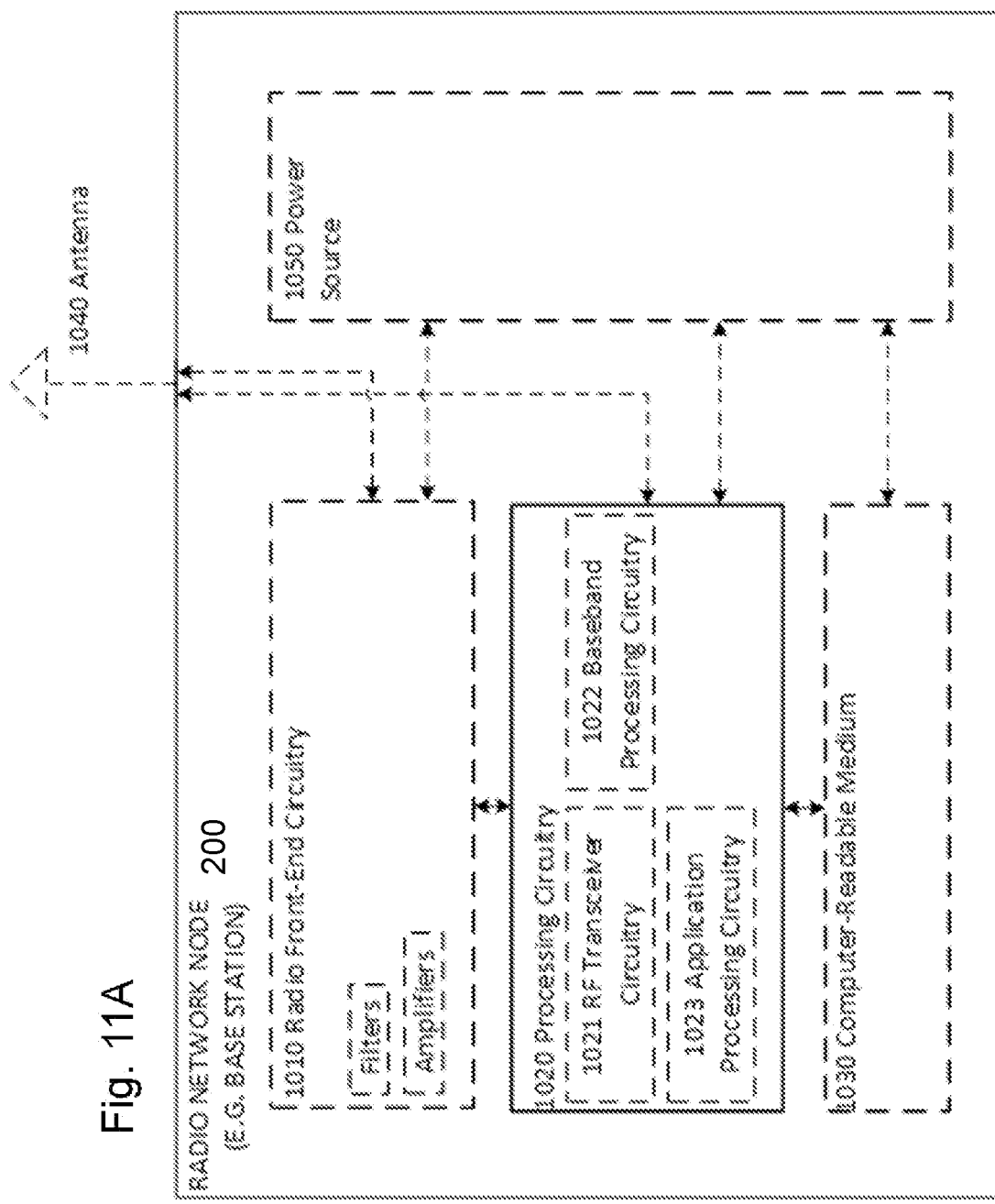

UNEVEN PAGING LOAD DISTRIBUTION FOR NARROWBAND

This application is a 371 of International Application No. PCT/162017/054771, filed Aug. 3, 2017, which claims the benefit of U.S. Provisional Application No. 62/371,347, filed Aug. 5, 2016, the disclosures of which are fully incorporated herein by reference.

TECHNICAL FIELD

This disclosure relates generally to wireless communications, and more specifically, to uneven distribution of paging loads for Narrowband Internet of Things (NB-IoT) operation with multiple physical resource blocks (PRBs).

INTRODUCTION

Narrowband Internet of Things (NB-IoT) is a narrowband system developed for cellular Internet of Things (IoT) by the Third Generation Partnership Project (3GPP). The system is based on existing long term evolution (LTE) systems and addresses optimized network architecture and improved indoor coverage for massive number of devices with one or more of the following characteristics: (a) low throughput devices (e.g., 2 kbps); (b) low delay sensitivity (e.g., ~10 seconds); (c) ultra-low device cost (e.g., below 5 dollars); and (d) low device power consumption (e.g., battery life of 10 years).

Each cell (e.g., ~1 km$^2$) in the system may serve thousands (e.g., ~50 thousand) of devices such as sensors, meters, actuators, and the like. NB-IoT uses a relatively narrow bandwidth (e.g., 180 KHz bandwidth, same as one LTE Physical Resource Block (PRB)) to make use of existing spectrum (e.g., GSM). The entire NB-IoT is contained within 200 kHz, or one PRB (i.e., 12 subcarriers of 15 kHz each). In NB-IoT this may be referred to as one carrier or one PRB.

Frequency division duplex (FDD) mode of NB-IoT (i.e., the transmitter and the receiver operate at different carrier frequencies) only needs to support half-duplex mode in the user equipment (UE). To achieve improved coverage, data repetition is used in uplink and/or downlink. The lower complexity of the devices (e.g., only one transmit/receive chain) means that some repetition might be needed in normal coverage also.

Further, to alleviate UE complexity, cross-subframe scheduling may be used. For example, a transmission is first scheduled on a narrowband physical downlink control channel (NPDCCH), and then the first transmission of the actual data on the narrowband physical downlink shared channel (NPDSCH) is carried out after the final transmission of the NPDCCH. Similarly, for uplink data transmission, information about resources scheduled by the network and needed by the UE for uplink transmission is first conveyed on the NPDCCH and then the first transmission of the actual data by the UE on the narrowband physical uplink shared channel (NPUSCH) is carried out after the final transmission of the NPDCCH. In other words, for both cases above, there is no simultaneous reception of control channel and reception/transmission of data channel from the UE's perspective.

Furthermore, not all the subframes are available for dedicated data communication in downlink in an NB-IoT cell. The amount of available subframes in the downlink is dependent on one of the three operation modes (i.e., Standalone, In-band, and Guard-band) that NB-IoT is deployed in.

For all operation modes, a UE needs to rate-match around the following non-available subframes (or parts of a subframe):

the NB-IoT primary and secondary synchronization channels (NPSS, and NSSS), where NPSS is transmitted every radio frame (NB-IoT radio frame length is same as in LTE; i.e., 10 ms and consists of 10 subframes. NPSS is transmitted in subframe number 5.)

the NB-IoT broadcast channel (NPBCH) containing the Master Information Block (MIB) occupying subframe 0 in every radio frame the NB-IoT system information blocks broadcast on NPDSCH (e.g. NSIB1 broadcast in the fourth subframe of every other radio frame)

downlink gaps when configured

NB-IoT reference symbols (NRS)

Additionally, for in-band operation mode, the UE needs to rate-match around LTE reference symbols such as cell-specific reference signals (CRS), positioning reference signals (PRS), and LTE multicast-broadcast single-frequency network (MBSFN) subframes.

Because of the nature of NB-IoT with respect to half-duplex communication, cross-subframe scheduling, low bandwidth, the available amount of subframes, and the amount of UEs to be served, NB-IoT can benefit from using more spectrum for efficient operation, especially if such spectrum is already available (e.g., in an in-band operation mode during low traffic hours when an LTE carrier is not fully used). Therefore, 3GPP Release 13 NB-IoT uses multi-carrier operation where the UE operating in an NB-IoT anchor carrier is configured through higher layer signaling (e.g., Layer 3 radio resource control (RRC)) to operate in an NB-IoT non-anchor carrier during connected mode operation. At the end of connected mode operation, the UE autonomously returns back to the anchor carrier.

The general approach of evenly distributing UEs over the carriers/PRBs, however, is not good for NB-IoT. In enhanced Machine Type Communication (eMTC) for example, which is similar to NB-IoT in many aspects, the paging load is evenly distributed over narrowbands (i.e., 6 PRB regions in the frequency domain) based on UE_ID. However, because all NB-IoT Release 13 UEs monitor paging on the downlink anchor PRB, non-anchor PRBs are under-used (if the Release 13 UE population in the network is large).

SUMMARY

Third Generation Partnership Project (3GPP) Release 14 may extend multi-carrier operation and (unlike Release 13 operation) user equipment (UEs) may be able to both monitor paging and perform Random Access on non-anchor carriers. Therefore, an object of the embodiments disclosed herein is to provide methods to unevenly distribute the paging load over multiple downlink anchor and non-anchor physical resource blocks (PRBs) (e.g., by setting a priority or weight for each PRB). Accordingly, the uneven distribution of Release 14 UEs may be used to balance out the concentrated distribution of Release 13 UEs to provide a more evenly distributed paging load overall.

A method performed by a wireless device is disclosed. The method generally comprises calculating a paging frame (PF) and paging occasion (PO). The method further comprises determining whether there are weights or priorities provided per PRB by the network. If weights or priorities are provided, the method further comprises calculating PF and PO using the weights or priorities. If no weights or priorities are provided, the PF and PO are calculated in a legacy manner.

Also disclosed is a wireless device. The wireless device comprises processing circuitry configured to calculate a paging frame (PF) and paging occasion (PO). The processing circuitry is further configured to determine whether there are weights or priorities provided per PRB by the network. If weights or priorities are provided, the PF and PO are calculated using the weights or priorities. If no weights or priorities are provided, the PF and PO are calculated in a legacy manner. The wireless device further comprises power supply circuitry configured to supply power to the wireless device.

A UE is also disclosed. The UE comprises an antenna configured to send and receive wireless signals. The UE further comprises radio front-end circuitry connected to the antenna and to processing circuitry, and configured to condition signals communicated between the antenna and the processing circuitry. The processing circuitry is configured to calculate a paging frame (PF) and paging occasion (PO). The processing circuitry is further configured to determine whether there are weights or priorities provided per PRB by the network. If weights or priorities are provided, the PF and PO are calculated using the weights or priorities. If no weights or priorities are provided, the PF and PO are calculated in a legacy manner. The user equipment further comprises an input interface connected to the processing circuitry and configured to allow input of information into the UE to be processed by the processing circuitry, and an output interface connected to the processing circuitry and configured to output information from the UE that has been processed by the processing circuitry. Yet further, the user equipment comprises a battery connected to the processing circuitry and configured to supply power to the UE.

A method performed by a network node is also disclosed. The method comprises determining whether uneven paging load distribution should be applied. If so, the method comprises calculating weights or priorities based on one or more criteria, and then broadcasting the calculated weights or priorities in system information. If uneven paging load distribution is not needed, the system information is broadcast without weights or priorities. Alternatively, the system information may be broadcast with weights or priorities that are all set equally.

In some embodiments, when uneven paging load distribution is needed, and the weights or priorities have been calculated and broadcast, the weights and priorities may periodically be adjusted in a recursive fashion. The adjustment comprises calculating the weights or priorities based on certain criteria and broadcasting the new weights or priorities.

Also disclosed is a network node. The network node includes processing circuitry and is configured to determine whether uneven paging load distribution should be applied. If so, the network node calculates weights or priorities based on one or more criteria, and then broadcasts the calculated weights or priorities in system information. If uneven paging load distribution is not needed, the system information is broadcast without weights or priorities. Alternatively, the system information may be broadcast with weights or priorities that are all set equally.

According to some embodiments, a method for use in a UE comprises receiving a plurality of weights for assigning paging PRBs to a plurality of UEs. Each weight is associated with a respective paging PRB. The method further comprises determining a paging PRB for the UE using at least one weight of the plurality of weights, and receiving paging on the determined paging PRB.

In particular embodiments, determining the paging PRB for the UE comprises assigning the UE to an artificial paging PRB of a set of artificial paging PRBs, and mapping the artificial paging PRB to an actual paging PRB of a set of actual paging PRBs using at least one weight of the plurality of weights. The set of actual paging PRBs includes a smaller number of paging PRBs than the set of artificial paging PRBs.

In particular embodiments, the UE is associated with a unique identifier. Assigning the UE to the artificial paging PRB comprises using an even distribution function to select the artificial paging PRB. The even distribution function comprises dividing the unique identifier by a total number of paging PRBs in the set of artificial paging PRBs. Mapping the artificial paging PRB to the actual paging PRB comprises using an uneven distribution function to select the actual paging PRB. The uneven distribution function comprises assigning a number of paging PRBs of the set of artificial paging PRBs to the paging PRBs of the set of actual paging PRBs according to the weights. The total number of paging PRBs in the set of artificial paging PRBs may comprise a sum of the plurality of weights.

In particular embodiments, receiving the plurality of weights comprises receiving broadcast system information. The weights may be based on at least one of the following: whether a PRB is an anchor PRB; a paging load or paging blocking probability; downlink traffic load; a number of anchor PRBs; a discontinuous reception (DRX) parameter; and a distribution of UEs according to their LTE release version.

According to some embodiments, a UE comprises a memory coupled to processing circuitry. The processing circuitry is operable to receive, from a network node, a plurality of weights for assigning paging PRBs to a plurality of UEs. Each weight of the plurality of weights is associated with a respective paging PRB. The processing circuitry is further operable to determine a paging PRB for the UE using at least one weight of the plurality of weights, and receive paging on the determined paging PRB.

In particular embodiments, the processing circuitry operable to determine the paging PRB for the UE is operable to assign the UE to an artificial paging PRB of a set of artificial paging PRBs, and map the artificial paging PRB to an actual paging PRB of a set of actual paging PRBs using at least one weight of the plurality of weights. The set of actual paging PRBs includes a smaller number of paging PRBs than the set of artificial paging PRBs.

In particular embodiments, the UE is associated with a unique identifier. The processing circuitry is operable to assign the UE to the artificial paging PRB by using an even distribution function to select the artificial paging PRB. The even distribution function comprises dividing the unique identifier by a total number of paging PRBs in the set of artificial paging PRBs. The processing circuitry is operable to map the artificial paging PRB to the actual paging PRB by using an uneven distribution function to select the actual paging PRB. The uneven distribution function comprises assigning a number of paging PRBs of the set of artificial paging PRBs to the paging PRBs of the set of actual paging PRBs according to the weights. The total number of paging PRBs in the set of artificial paging PRBs may comprise a sum of the plurality of weights.

In particular embodiments, the processing circuitry is operable to receive the plurality of weights by receiving broadcast system information. The weights may be based on at least one of the following: whether a PRB is an anchor PRB; a paging load or paging blocking probability; downlink traffic load; a number of anchor PRBs; a DRX parameter; and a distribution of UEs according to their LTE release version.

According to some embodiments, a method for use in a network node of assigning PRBs to a plurality of UEs to unevenly distribute a paging load to balance an existing paging load in a wireless network comprises obtaining a plurality of weights for assigning paging PRBs to a plurality of UEs. Each weight of the plurality of weights is associated with a respective paging PRB and the plurality of weights unevenly assign UEs to paging PRBs to unevenly distribute a paging load. The method further comprises transmitting the plurality of weights to one or more UEs.

In particular embodiments, obtaining the plurality of weights comprises the network node determining the weights. The weights may be based on at least one of the following: whether a PRB is an anchor PRB; a paging load or paging blocking probability; downlink traffic load; a number of anchor PRBs; a DRX parameter; and a distribution of UEs according to their LTE release version. Transmitting the plurality of weights may comprise broadcasting system information.

In particular embodiments, the method further comprises assigning a paging PRB for a UE of the plurality of UEs using at least one weight of the plurality of weights, and paging the UE using the assigned paging PRB. Assigning the paging PRB for the UE may comprise assigning the UE to an artificial paging PRB of a set of artificial paging PRBs, and mapping the artificial paging PRB to an actual paging PRB of a set of actual paging PRBs using at least one weight of the plurality of weights. The set of actual paging PRBs includes a smaller number of paging PRBs than the set of artificial paging PRBs.

In particular embodiments, the UE is associated with a unique identifier. Assigning the UE to the artificial paging PRB comprises using an even distribution function to select the artificial paging PRB. The even distribution function comprises dividing the unique identifier by a total number of paging PRBs in the set of artificial paging PRBs. Mapping the artificial paging PRB to the actual paging PRB comprises using an uneven distribution function to select the actual paging PRB. The uneven distribution function comprises assigning a number of paging PRBs of the set of artificial paging PRBs to the paging PRBs of the set of actual paging PRBs according to the weights. The total number of paging PRBs in the set of artificial paging PRBs may comprise a sum of the plurality of weights.

According to some embodiments, a network node comprises a memory coupled to processing circuitry. The network node is capable of assigning paging PRBs to a plurality of UEs to unevenly distribute a paging load to balance an existing paging load in a wireless network. The processing circuitry is operable to obtain a plurality of weights for assigning paging PRBs to a plurality of UEs. Each weight of the plurality of weights is associated with a respective paging PRB and the plurality of weights unevenly assign UEs to paging PRBs to unevenly distribute a paging load. The processing circuitry is further operable to transmit the plurality of weights to one or more UEs.

In particular embodiments, the processing circuitry is operable to obtain the plurality of weights by determining the weights. The processing circuitry may be operable to transmit the plurality of weights by broadcasting system information.

In particular embodiments, the processing circuitry is further operable to assign a paging PRB for a UE of the plurality of UEs using at least one weight of the plurality of weights, and page the UE using the assigned paging PRB.

In particular embodiments, the processing circuitry is operable to assign the paging PRB for the UE by assigning the UE to an artificial paging PRB of a set of artificial paging PRBs, and mapping the artificial paging PRB to an actual paging PRB of a set of actual paging PRBs using at least one weight of the plurality of weights. The set of actual paging PRBs includes a smaller number of paging PRBs than the set of artificial paging PRBs.

In particular embodiments, the UE is associated with a unique identifier. The processing circuitry is operable to assign the UE to the artificial paging PRB by using an even distribution function to select the paging PRB. The even distribution function comprises dividing the unique identifier by a total number of paging PRBs in the set of artificial PRBs. The processing circuitry is operable to map the artificial paging PRB to the actual paging PRB by using an uneven distribution function to select the actual paging PRB. The uneven distribution function comprises assigning a number of paging PRBs of the set of artificial paging PRBs to the paging PRBs of the set of actual paging PRBs according to the weights. The total number of paging PRBs in the set of artificial paging PRBs may comprise a sum of the plurality of weights.

According to some embodiments, a UE comprises a receiving module and a determining module. The receiving module is operable to receive, from a network node, a plurality of weights for assigning PRBs to a plurality of UEs. Each weight of the plurality of weights is associated with a respective paging PRB. The determining module is operable to determine a paging PRB for the UE using at least one weight of the plurality of weights. The receiving module is further operable to receive paging on the determined paging PRB.

According to some embodiments, a network node comprises an obtaining module and a transmitting module. The obtaining module is operable to obtain a plurality of weights for assigning paging PRBs to a plurality of UEs. Each weight of the plurality of weights is associated with a respective paging PRB and the plurality of weights unevenly assign UEs to paging PRBs to unevenly distribute a paging load. The transmitting module is operable to transmit the plurality of weights to one or more UEs.

Also disclosed is a computer program product. The computer program product comprises instructions stored on non-transient computer-readable media which, when executed by a processor, perform the act of receiving a plurality of weights for assigning paging PRBs to a plurality of UEs. Each weight is associated with a respective paging PRB. The instructions further perform the acts of determining a paging PRB for the UE using at least one weight of the plurality of weights, and receiving paging on the determined paging PRB.

Also disclosed is another computer program product. The computer program product comprises instructions stored on non-transient computer-readable media which, when executed by a processor, perform the act of obtaining a plurality of weights for assigning paging PRBs to a plurality of UEs. Each weight of the plurality of weights is associated with a respective paging PRB and the plurality of weights unevenly assign UEs to paging PRBs to unevenly distribute a paging load. The instructions further perform the act of transmitting the plurality of weights to one or more UEs.

Certain embodiments may provide one or more technical advantages. For example, some embodiments may advantageously enable network control for distributing the paging load among available downlink carriers for NB-IoT. As a particular example, based on network knowledge of UE release population distribution and/or upon paging capacity problems and/or congestion, the network may be able to distribute more than an equal part of the paging load to the non-anchor carriers (which are not loaded with the paging/Msg2/Msg4 load from all 3GPP Release 13 UEs and NPSS/NSSS, NPBCH and System Information broadcast). For 3GPP Release 14 multi-PRB operation, this may beneficially account for the fact that the traffic/load of NB-IoT downlink PRBs are not equal (anchor PRBs contain NPSS/NSSS, NPBCH and System Information broadcast and also all paging/Msg2/Msg4 transmissions for 3GPP Release 13 UEs). Other advantages may be readily available to one having skill in the art. Certain embodiments may have none, some, or all of the recited advantages.

BRIEF DESCRIPTION OF THE DRAWINGS

For a more complete understanding of the embodiments and their features and advantages, reference is now made to the following description, taken in conjunction with the accompanying drawings, in which:

FIG. 11A is a block diagram illustrating an example embodiment of a network node; and FIG. 11B is a block diagram illustrating example components of a network node.

DETAILED DESCRIPTION

Figure 1:
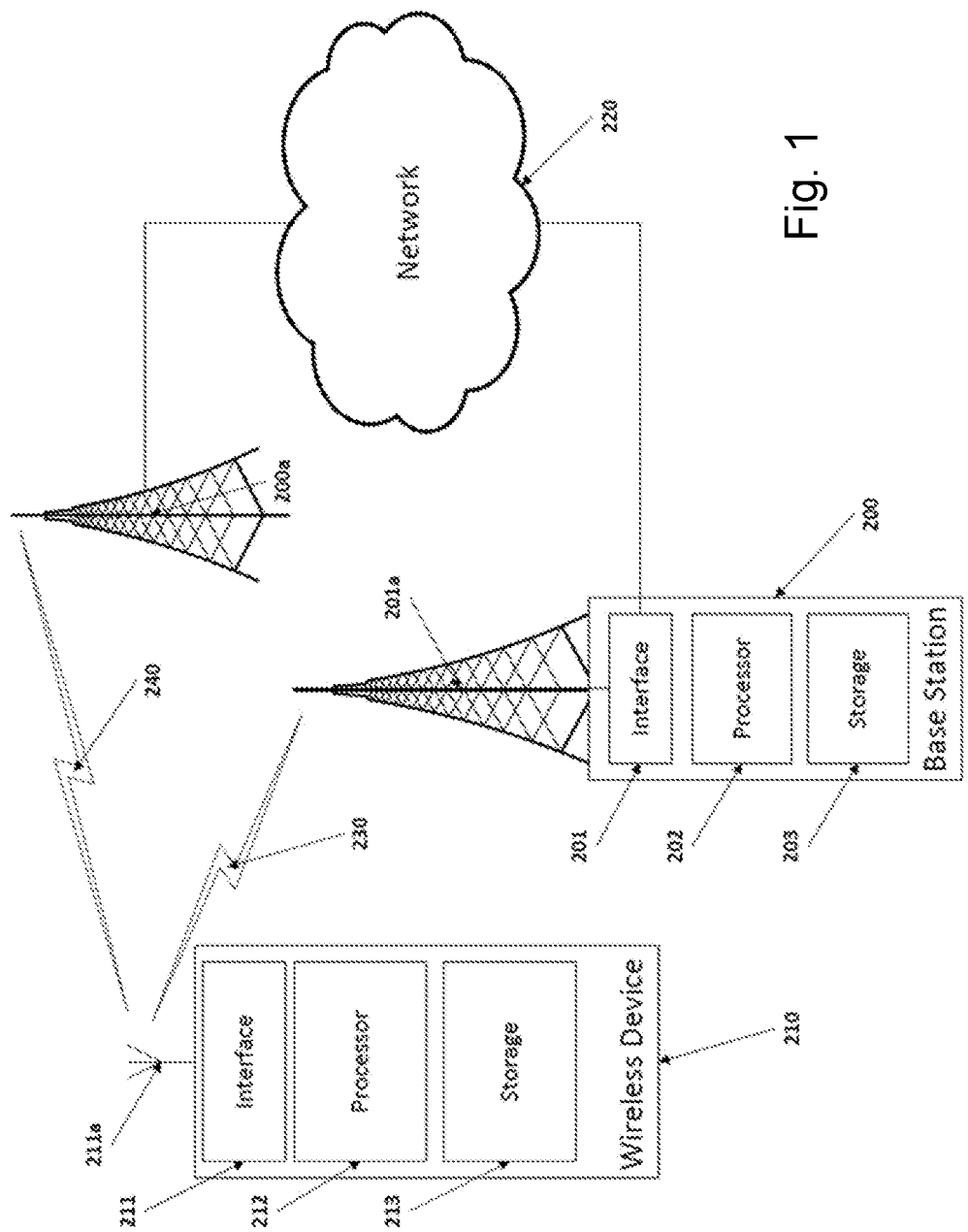
FIG. 1 is a block diagram illustrating an example wireless network, according to a particular embodiment.

Narrowband Internet of Things (NB-IoT) is a narrowband system developed for cellular Internet of Things (IoT) by the Third Generation Partnership Project (3GPP). The system is based on existing long term evolution (LTE) systems and addresses optimized network architecture and improved indoor coverage for massive number of typically low cost, low complexity, and low throughput devices.

3GPP Release 13 NB-IoT uses multi-carrier operation where a user equipment (UE) operating in an NB-IoT anchor carrier is configured through higher layer signaling to operate in an NB-IoT non-anchor carrier during connected mode operation. At the end of connected mode operation, the UE autonomously returns back to the anchor carrier.

The general approach of evenly distributing UEs over the carriers or physical resource blocks (PRBs), however, is not good for NB-IoT. In enhanced Machine Type Communication (eMTC) for example, which is similar to NB-IoT in many aspects, the paging load is evenly distributed over narrowbands (i.e., 6 PRB regions in the frequency domain) based on UE_ID. However, because all NB-IoT Release 13 UEs monitor paging on the downlink anchor PRB, non-anchor PRBs are under-used if the Release 13 UE population in the network is large.

3GPP Release 14 may extend multi-carrier operation and (unlike Release 13 operation) UEs may be able to both monitor paging and perform Random Access on non-anchor carriers. Therefore, an object of the embodiments disclosed herein is to provide methods to unevenly distribute the paging load over multiple downlink anchor and non-PRBs (e.g., by setting a priority or weight for each PRB). Accordingly, the uneven distribution of Release 14 UEs may be used to balance out the concentrated distribution of Release 13 UEs to provide a more evenly distributed paging load overall.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 1-11B of the drawings, like numerals being used for like and corresponding parts of the various drawings. LTE and NR are used throughout this disclosure as an example cellular system, but the ideas presented herein may apply to other wireless communication systems as well.

FIG. 1 is a block diagram illustrating an example wireless network, according to a particular embodiment. Although the solutions described herein may be implemented in any appropriate type of system using any suitable components, particular embodiments of the described solutions may be implemented in a wireless network such as the example wireless communication network illustrated in FIG. 1. In the example embodiment of FIG. 1, the wireless communication network provides communication and other types of services to one or more wireless devices. In the illustrated embodiment, the wireless communication network includes one or more instances of network equipment that facilitate the wireless devices' access to and/or use of the services provided by the wireless communication network. The wireless communication network may further include any additional elements suitable to support communication between wireless devices or between a wireless device and another communication device, such as a landline telephone.

The wireless communication network may represent any type of communication, telecommunication, data, cellular, and/or radio network or other type of system. In particular embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

FIG. 1 illustrates an example wireless network comprising a detailed view of a network node 200 and a wireless device (WD) 210, in accordance with particular embodiments. For simplicity, FIG. 1 only depicts network 220, network nodes 200 and 200a, and WD 210. Network node 200 comprises processor 202, storage 203, interface 201, and antenna 201a. Similarly, WD 210 comprises processor 212, storage 213, interface 211 and antenna 211a. These components may work together in order to provide network node and/or wireless device functionality, such as providing wireless connections in a wireless network and assigning wireless devices to paging PRBs. A paging PRB may also be referred to as a paging carrier. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

Network 220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

As used herein, "network equipment" or "network node" refers to equipment capable, configured, arranged and/or operable to communicate directly or indirectly with a wireless device and/or with other equipment in the wireless communication network that enable and/or provide wireless access to the wireless device. Examples of network equipment include, but are not limited to, access points (APs), in particular radio access points. Network equipment may represent base stations (BSs), such as radio base stations.

Particular examples of radio base stations include Node Bs, and evolved Node Bs (eNBs). Base stations may be categorized based on the amount of coverage they provide (or, stated differently, their transmit power level) and may then also be referred to as femto base stations, pico base stations, micro base stations, or macro base stations. "Network equipment" or "network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS). As a particular non-limiting example, a base station may be a relay node or a relay donor node controlling a relay.

Yet further examples of network equipment include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network equipment may represent any suitable device (or group of devices) capable, configured, arranged, and/or operable to enable and/or provide a wireless device access to the wireless communication network or to provide some service to a wireless device that has accessed the wireless communication network.

According to the illustrated embodiment, network node 200 comprises processor 202, storage 203, interface 201, and antenna 201a. These components are depicted as single boxes located within a single larger box. In practice however, a network node may comprise multiple different physical components that make up a single illustrated component (e.g., interface 201 may comprise terminals for coupling wires for a wired connection and a radio transceiver for a wireless connection). As another example, network node 200 may be a virtual network node in which multiple different physically separate components interact to provide the functionality of network node 200 (e.g., processor 202 may comprise three separate processors located in three separate enclosures, where each processor is responsible for a different function for a particular instance of network node 200). Similarly, network node 200 may be composed of multiple physically separate components (e.g., a NodeB component and a RNC component, a BTS component and a BSC component, etc.), which may each have their own respective processor, storage, and interface components. In certain scenarios in which network node 200 comprises multiple separate components (e.g., BTS and BSC components), one or more of the separate components may be shared among several network nodes. For example, a single RNC may control multiple NodeB's. In such a scenario, each unique NodeB and BSC pair may be a separate network node. In some embodiments, network node 200 may be configured to support multiple RATs. In such embodiments, some components may be duplicated (e.g., separate storage 203 for the different RATs) and some components may be reused (e.g., the same antenna 201a may be shared by the RATs).

Processor 202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 200 components, such as storage 203, network node 200 functionality. For example, processor 202 may execute instructions stored in storage 203. Such functionality may include providing various wireless features discussed herein to wireless devices, such as WD 210, including any of the steps or methods disclosed herein.

Storage 203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 203 may store any suitable instructions, data or information, including software and encoded logic, utilized by network node 200. In some embodiments, storage 203 may store one or more reference, observed or relative modulation scores and information related to the various wireless connections and cells associated with network node 200 and/or 200a. The modulation scores may be maintained in a list, database, or other organization of data useful for identifying target cells to which to change the WDs wirelessly connected to network node 200 and/or WDs wirelessly connected to other network nodes, such as network node 200a.

Network node 200 also comprises interface 201 which may be used in the wired or wireless communication of signalling and/or data between network node 200, network 220, and/or WD 210. For example, interface 201 may perform any formatting, coding, or translating that may be needed to allow network node 200 to send and receive data from network 220 over a wired connection. Interface 201 may also include a radio transmitter and/or receiver that may be coupled to or a part of antenna 201a. The radio may receive digital data that is to be sent out to other network nodes or WDs via a wireless connection. The radio may convert the digital data into a radio signal having the appropriate channel and bandwidth parameters. The radio signal may then be transmitted via antenna 201a to the appropriate recipient (e.g., WD 210).

Antenna 201a may be any type of antenna capable of transmitting and receiving data and/or signals wirelessly. In some embodiments, antenna 201a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "wireless device" refers to a device capable, configured, arranged and/or operable to communicate wirelessly with network equipment and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user. The wireless device may support device-to-device (D2D) communication, for example by implementing a 3GPP standard for sidelink communication, and may in this case be referred to as a D2D communication device.

As yet another specific example, in an Internet of Things (TOT) scenario, a wireless device may represent a machine or other device that performs monitoring and/or measurements, and transmits the results of such monitoring and/or measurements to another wireless device and/or a network equipment. The wireless device may in this case be a machine-to-machine (M2M) device, which may in a 3GPP context be referred to as a machine-type communication (MTC) device. As one particular example, the wireless device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches, etc. In other scenarios, a wireless device may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

According to the illustrated embodiment, WD 210 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 200. WD 210 comprises processor 212, storage 213, interface 211, and antenna 211a. Like network node 200, the components of WD 210 are depicted as single boxes located within a single larger box, however, in practice a wireless device may comprise multiple different physical components that make up a single illustrated component (e.g., storage 213 may comprise multiple discrete microchips, each microchip representing a portion of the total storage capacity).

Processor 212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 210 components, such as storage 213, WD 210 functionality. Such functionality may include providing various wireless features discussed herein, including any of the steps or methods disclosed herein.

Storage 213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 213 may store any suitable data, instructions, or information, including software and encoded logic, utilized by WD 210. In some embodiments storage 213 may maintain a list, database, or other organization of data (e.g., such as PRB weights) useful for assigning UEs, such as WD 210, to a paging PRB.

Interface 211 may be used in the wireless communication of signalling and/or data between WD 210 and network node 200. For example, interface 211 may perform any formatting, coding, or translating that may be needed to allow WD 210 to send and receive data from network node 200 over a wireless connection. Interface 211 may also include a radio transmitter and/or receiver that may be coupled to or a part of antenna 211a. The radio may receive digital data that is to be sent out to network node 201 via a wireless connection. The radio may convert the digital data into a radio signal having the appropriate channel and bandwidth parameters. The radio signal may then be transmitted via antenna 211a to network node 200.

Antenna 211a may be any type of antenna capable of transmitting and receiving data and/or signals wirelessly. In some embodiments, antenna 211a may comprise one or more omni-directional, sector or panel antennas operable to transmit/receive radio signals between 2 GHz and 66 GHz. For simplicity, antenna 211a may be considered a part of interface 211 to the extent that a wireless signal is being used.

Although the wireless device and network node described in the example wireless communication network of FIG. 1 may represent devices and nodes that include any suitable combination of hardware and/or software, the devices and nodes may, in particular embodiments, represent particular devices and nodes. Some example implementations of wireless devices, network equipment, and radio nodes illustrated above are described below with respect to FIGS. 10A-11B.

In more detail the network (eNB or other NW node) determines weights or priorities for the paging PRBs. Although they may vary in scope and implementation, the terms "weights" and "priorities" may be used interchangeably throughout this disclosure. The term "uneven" load distribution may also be referred to as "biased", "non-uniform", etc. The general purpose of the weights or priorities is to unevenly assign UEs to paging PRBs and achieve an uneven paging load distribution. The weights or priorities can be determined based on various factors, including but not limited to one or more of the following factors: (a) whether a particular PRB is an anchor PRB containing NPSS/NSSS, NPBCH and System Information broadcast; (b) the paging load and/or paging blocking probability; (c) other downlink load (e.g., Random Access msg2, msg4 or expected dedicated traffic (Release 13 Multi-carrier connected sessions)); (d) the number of configured non-anchor PRBs; (e) the factors used for calculating the paging PRB, the paging occasion (PO) and the paging frame (PF), such as the DRX cycle length used (T), the Nb factor, and/or the total number of paging PRBs Nn; and (f) the knowledge of how the UE 3GPP release population is in a specific cell and/or cluster of cells and/or tracking area (TA) and/or PLMN.

The weights of priorities of the paging PRBs are determined by the network based on, for example, the above, and the values of the weights/priorities are communicated to the UEs in System Information broadcast information (e.g., in the PCCH-configuration contained in SIB2). For particular embodiments, both the UE and the network have the same understanding of which paging PRB the UE is assigned to. Note that randomly re-assigning some UEs to other PRBs is not sufficient because the UEs would not be aware of the re-assignment.

The following is a variant of the eMTC equation of evenly distributing UEs over paging narrowbands applied to NB-IoT:

$$\text{Paging PRB} = \text{floor}(UE\_ID/N) \bmod Nn \qquad (1)$$

where $N=\min(T,nB)$, UE_ID is the IMSI UE identity (potentially only a certain number of bits of the IMSI by applying a modulo operation, e.g. UE_ID=IMSI modulo $2^{14}$ uses the 14 least significant bits of the IMSI) and Nn is the total number of paging PRBs.

Other variants of the formula (1) are also possible. One such example is to distribute the UEs evenly among the paging PRBs according to the UE_ID:

$$\text{Paging PRB} = UE\_ID \bmod Nn \qquad (2)$$

In a first group of embodiments, each paging PRB in the cell is assigned a weight/priority. This is denoted as w(i) below, where i identifies the paging PRB in the cell, and there may be j paging PRBs in total used in the cell. Then any of the above equations (i.e., (1) or (2)), may be used to assign UEs to paging PRBs, but instead of using Nn=j, a larger number of PRBs (denoted artificial PRBs) is used to set the value of Nn in (1) or (2). The weight of the actual PRBs is then used when mapping the artificial PRBs to actual PRBs to achieve an uneven distribution of the UEs among the actual PRBs.

In particular embodiments, mapping the artificial PRBs to actual PRBs is done by using a mapping-vector that has the size of Nn (i.e., the number of artificial PRBs) where each vector index corresponds to one artificial PRB, and the value gives the mapping to any of the actual PRBs (i.e., PRB1 . . . . PRBj). The mapping-vector may be derived from signaling only the weights (w(i), i=1, . . . , j) for each of the actual PRBs, or it may be signaled/transmitted explicitly from the network to the UE (or as yet another alternative signaling the weights, the number of artificial PRBs, and a rule is defined for how to create the mapping-vector). If the mapping-vector is derived from only the weights, it may be done by using the following formula/method:

$$[PRB1_1, \ldots, PRB1_{w(1)}, PRB2_1, \ldots, PRB2_{w(2)}, \ldots, PRBj_1, \ldots, PRBj_{w(j)}] \qquad (3)$$

In a typical case, only the PRB's weight (w(i)) is signaled to the UE in a cell through system information. Then the UE calculates/constructs the mapping-vector by using (3) above. The length of the mapping vector may be the sum of all weights (i.e., w(1)+w(2)+ . . . +w(j)). If the mapping-vector is signaled, the number of artificial PRBs (used as Nn) may be arbitrarily chosen to achieve different uneven UE distributions among the actual PRBs.

In a simple example, assume two actual PRBs in a cell (j=2) and a distribution of ⅓ (i.e., ⅓ of the UEs on PRB1, and ⅔ of the UEs on PRB2). Then PRB1 is assigned with the weight w(1)=1 and PRB2 with the weight w(2)=2. If these weights are signaled and the mapping-vector derived from (3), then Nn is artificially set to 3 in equation (1) or (2) above and all UEs will be evenly distributed into the three artificial PRBs. In a second step, the three artificial PRBs are mapped to the two actual paging PRBs using the mapping-vector which is determined from the weights according to (3). In this case the mapping-vector is [1,2,2] because PRB2 has twice the weight of PRB1. All UEs mapped to the first artificial PRB that has mapping-vector value 1 will be assigned to PRB1 and all UEs mapped to the second or third artificial PRB that has mapping-vector value 2 will be assigned to PRB2, which means that in this case twice as many UEs will be assigned to PRB2. An example is illustrated in FIG. 2.

Figure 2:
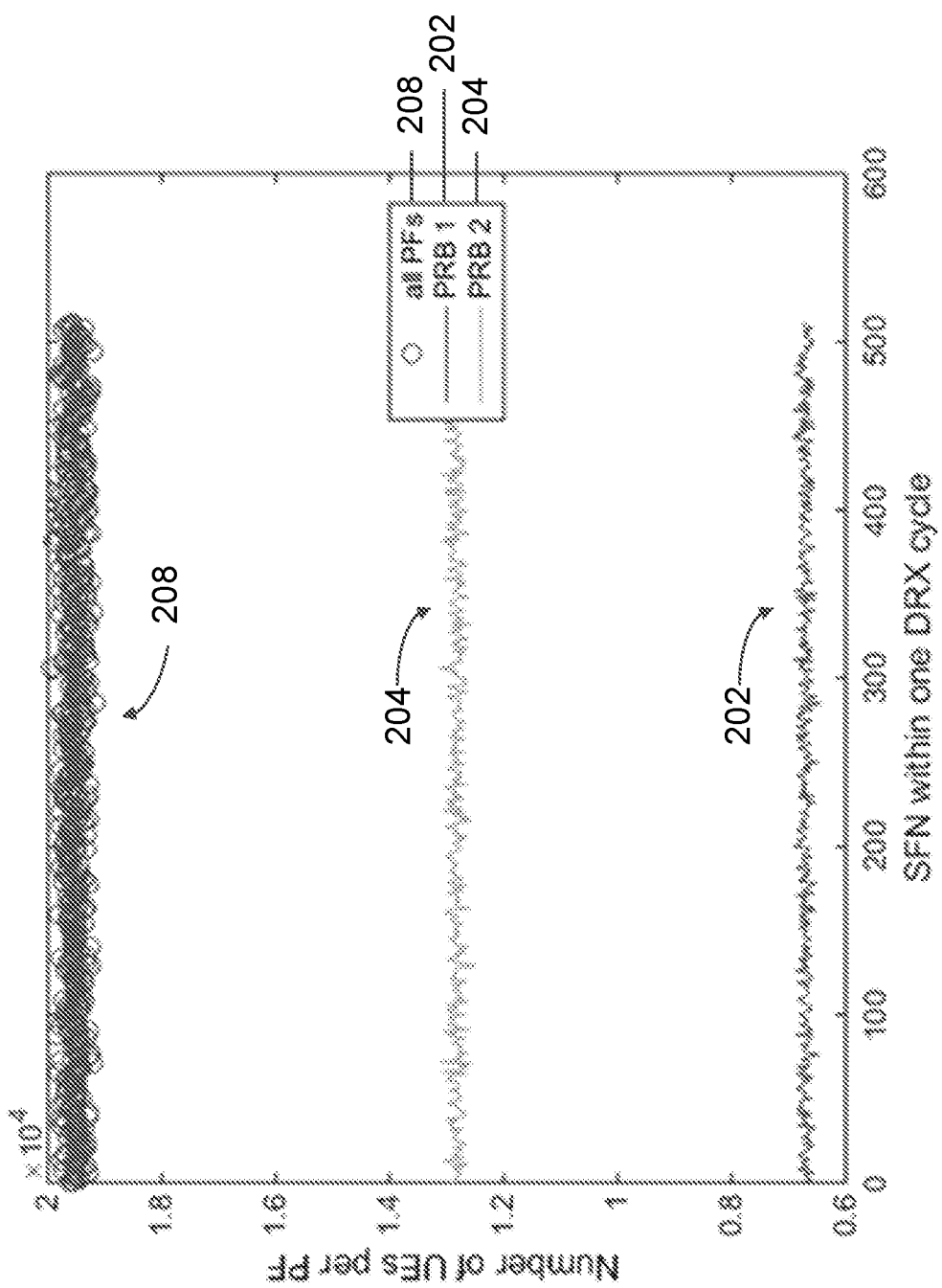
FIG. 2 is a schematic diagram showing UE distribution over paging frames, according to certain embodiments of the present disclosure.

FIG. 2 is a schematic diagram showing UE distribution according to certain embodiments of the present disclosure. The graph illustrates an example of uneven distribution of UEs over two paging PRBs. Circles 208 represent the total number of UEs on all paging frames, graph line 202 represents the number of UEs assigned to PRB 1, and graph line 204 represents the number of UEs assigned to PRB 2.

In the illustrated example, the weights are relative numbers in the range 1 to 5 and the settings are [1, 2] for PRB1 and PRB2, respectively. Further, T=512, Nb=4T, Nn=2, and there are 10,000,000 UEs in the calculation. The resulting UE distribution is [0.34, 0.66] for PRB1 and PRB2, which is approximately the same as the normalized weight vector [0.33, 0.67].

The graph results illustrates a calculation/simulation consisting of 10,000,000 UEs with randomly different UE_IDs and how they are distributed between PRB1 and PRB2 according to the example above where PRB1 has weight 1 and PRB2 weight 2 when using formula (1) and (3). In this example the UE_ID is calculated as IMSI modulo 214. The resulting UE distribution of this simulation is [0.34, 0.66] for PRB1 and PRB2 which is approximately the same as the normalized weight vector: [1/(1+2), 2/(1+2)]=[⅓, ⅔].

In the following example the mapping vector is not derived, but instead the weights and number of artificial PRBs are signaled/transmitted, and the UE follows a predefined formula for how to derive the mapping-vector. Three PRBs are used (j=3), with weights w(1)=1, w(2)=3 and w(3)=5, and the number of artificial PRBs is 15 (denoted Nmanga below). The following formula may be used to determine the number of artificial PRBs that should be mapped to actual PRBs:

$$PRBi_{map}=\text{Round}(Nmanga*w(i)/\Sigma w)$$

where $\Sigma w$ is the sum of all weights.

Figure 3:
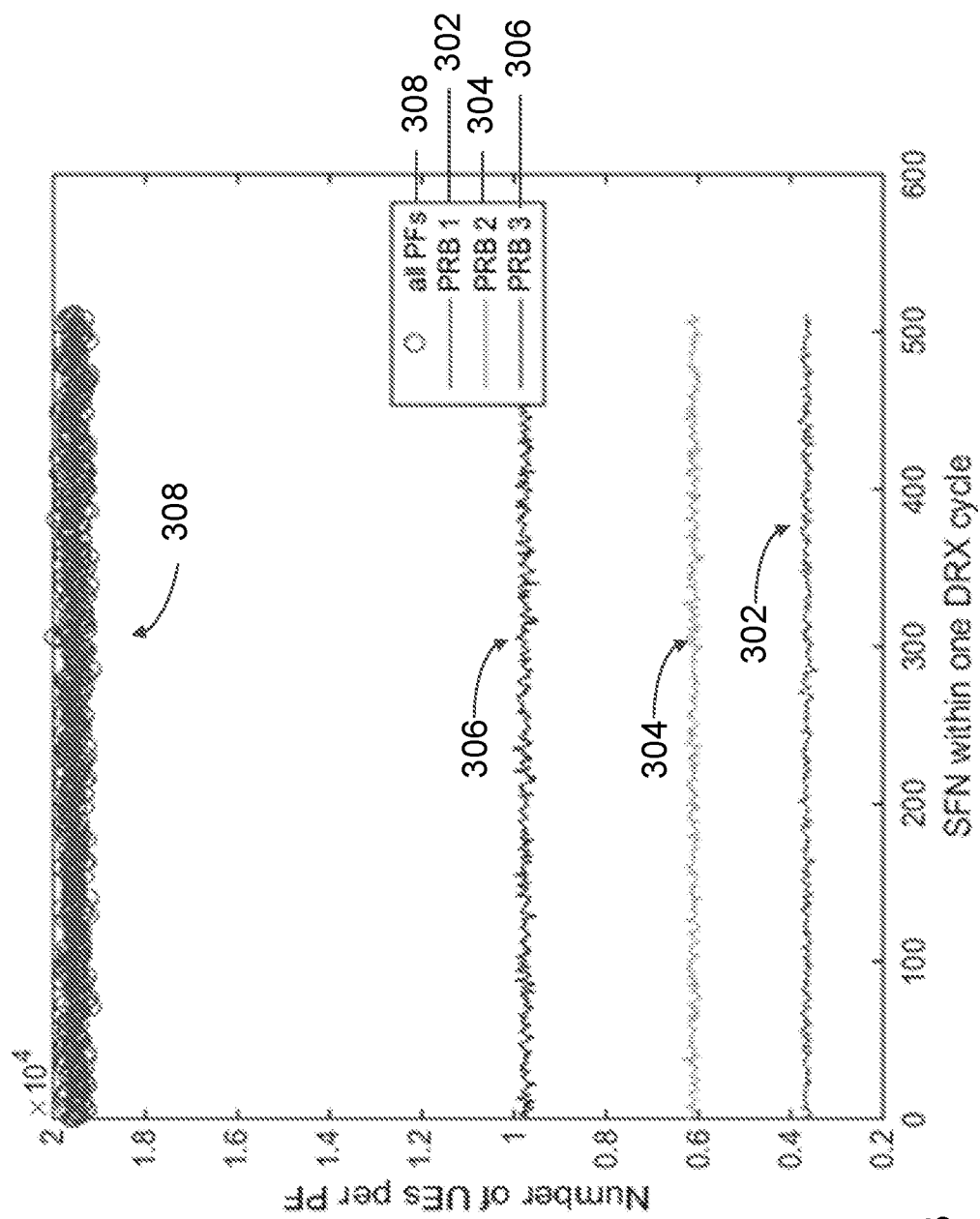
FIG. 3 is another schematic diagram showing UE distribution over paging frames, according to certain embodiments of the present disclosure.

In this example the following applies: $PRB1_{map}$=Round (15*⅑)=2; $PRB2_{map}$=Round(15*⅗)=5; and $PRB3_{map}$=Round(15*⅚)=8. Thus, the mapping-vector in this example is: [1,1,2,2,2,2,2,3,3,3,3,3,3,3,3]. FIG. 3 below shows the result of the calculation/simulation using the same parameters as in the previous example (i.e., usage of formula (1), T=512, nB=4T and the UE_ID calculated as IMSI modulo $2^{14}$).

Although the terms artificial and actual PRBs and artificial and actual paging PRBs are used for simplicity of explanation, one of ordinary skill will understand that assigning a UE to an artificial or actual paging PRB may be performed or represented by an equation or multiple equations that first distribute a UE among a first set of paging PRBs (i.e., artificial), and then maps that distribution among a second, smaller, set of paging PRBs (i.e., actual).

FIG. 3 is another schematic diagram showing UE distribution according to certain embodiments of the present disclosure. The graph illustrates an example of uneven distribution of UEs over three paging PRBs. Circles 308 represent the total number of UEs on all paging frames, graph line 302 represents the number of UEs assigned to PRB 1, graph line 304 represents the number of UEs assigned to PRB 2, and graph line 306 represents the number of UEs assigned to PRB 3.

Example Matlab code for the example, included simply as a reference, may include the following:

```
vikt=[1,3,5]; %Weight 1 to 5 per PRB. Length
equal to Nn.
Nmanga=Nn*5;
PNBmanga=mod(floor(UE_ID/(N)),Nmanga);
numberPnb(1)=round(vikt(1)/sum(vikt)*Nmanga);
Mappning=[0*ones(1, numberPnb(1) ) ] ;
for m=1:Nn−1
numberPnb(m+1)=round(vikt(m+1)/sum(vikt)*Nmanga)
;
    Mappning=[Mappning, m*ones(1,
numberPnb(m+1) ) ];
end
PNBvikt=Mappning(PNBmanga+1);
```

The result of the fraction of UEs allocated to the 3 PRBs are in this case [0.19, 0.31, 0.50], which is close to the normalized weights [⅑, ⅜, ⅝]=[0.11, 0.33, 0.55]. The reason for the discrepancy is that formula (1) is used with a 14 bit UE_ID and a large value of N. As N=512 the first part of (1), i.e. floor(UE_ID/N), results in a value between 0-31 (as $2^{14}$/512=32). Because this is not dividable by 15, the resulting mapping is the following for the 3 PRBs: [6/32, 10/32, 16/32]=[0.1875, 0.3125, 0.50].

Figure 4:
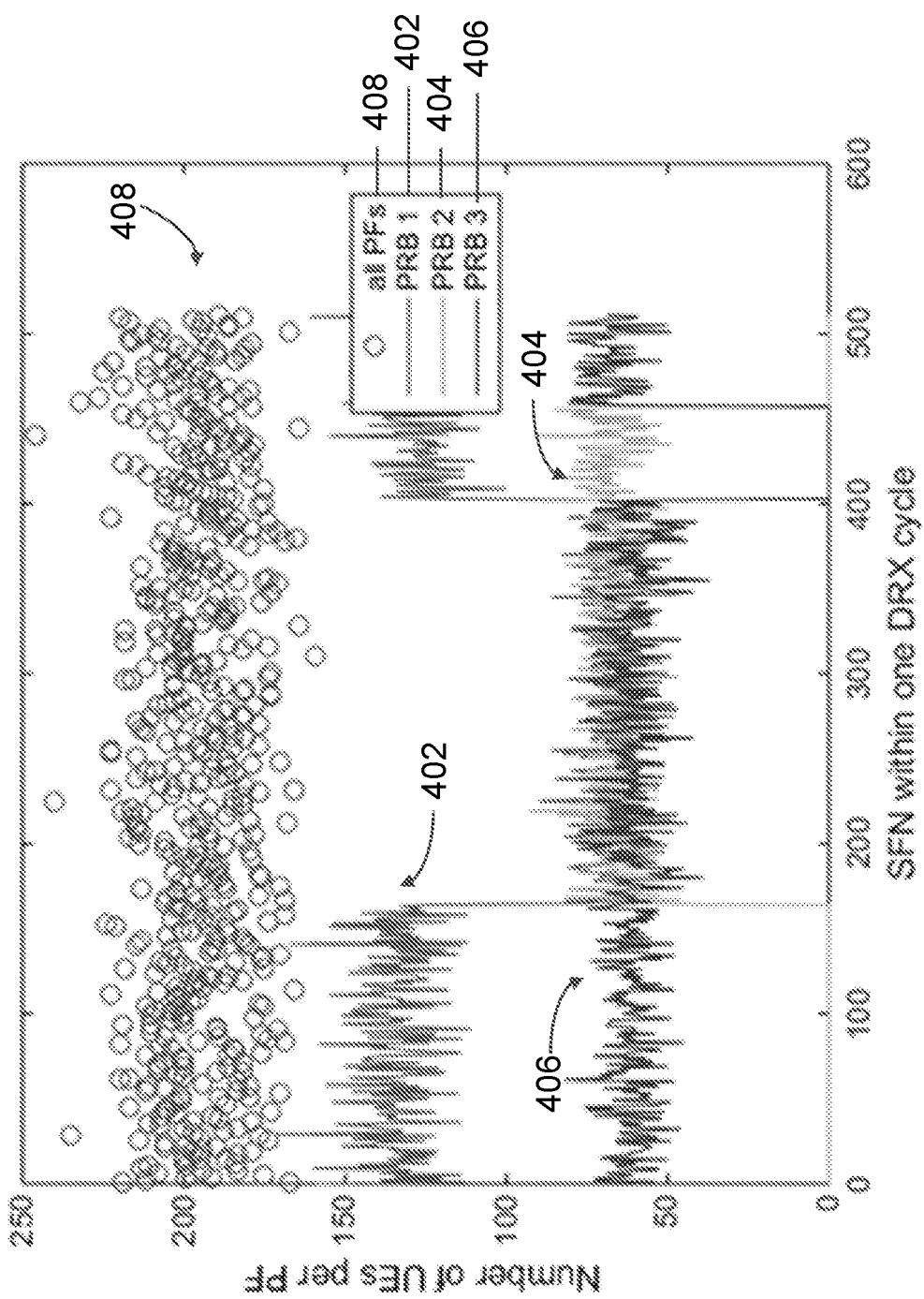
FIG. 4 is another schematic diagram showing UE distribution over paging frames, according to certain embodiments of the present disclosure.

In a second group of embodiments, the UEs are allocated to paging PRBs based on UE_ID (as for eMTC) but in addition a weight per PRB is included. In this way the borders for the modulus operation are changed between paging PRBs based on the relative weight, resulting in an uneven number of UEs being assigned to the PRBs depending on the weights. An example is illustrated in FIG. 4. The example is not perfect because it leads to uneven distribution of UEs over the possible paging frames in each PRB.

FIG. 4 is another schematic diagram showing UE distribution according to certain embodiments of the present disclosure. The graph illustrates an example of uneven distribution of UEs over three paging PRBs. Circles 408 represent the total number of UEs on all paging frames, graph line 402 represents the number of UEs assigned to PRB 1, graph line 404 represents the number of UEs assigned to PRB 2, and graph line 406 represents the number of UEs assigned to PRB 3.

In the illustrated example, the weights are [2, ½, 1] for PRB1, PRB2 and PRB3, respectively, and there are 100,000 UEs in the calculation. Otherwise, the settings and parameter values are the same as for the examples for the first group of embodiments.

Example Matlab code may comprise the following:

```
NB=mod(floor(UE_ID/(N) ),Nn);
prio=[2,0.5,1];            %Nn=3
P=prio./sum(prio)*sum(length(prio))%Prio in
interval (0,2]
PNBvikt=PNB;
for j=1:length(UE_ID)
    if mod(UE_ID(j)/N,1) > 0.5
        PNBvikt(j)=mod(floor(UE_ID(j)/N −
1/4*(P(mod(floor(UE_ID(j)/N),Nn)+1)−
P(mod(floor(UE_ID(j)/N)+1,Nn)+1))), Nn);
    else
        PNBvikt(j)=mod(floor(UE_ID(j)/N +
1/4*(P(mod(floor(UE_ID(j)/N),Nn)+1)−
P(mod(floor(UE_ID(j)/N)−1,Nn)+1))), Nn);
    end
end
```

In a third group of example embodiments, the UEs are assigned to paging PRBs in a similar manner as eMTC UEs are assigned to a paging narrowband, but instead of being assigned a "hard" PRB index, a certain UE is assigned a "soft" array value based on the PRB priorities. In a second step, a quasi-random number based on the UE_ID and PRB index is added to the array making a certain amount of UEs using a PRB of higher priority depending on the PRB weights/priorities. An example of this is shown in FIG. 5 below.

Figure 5:
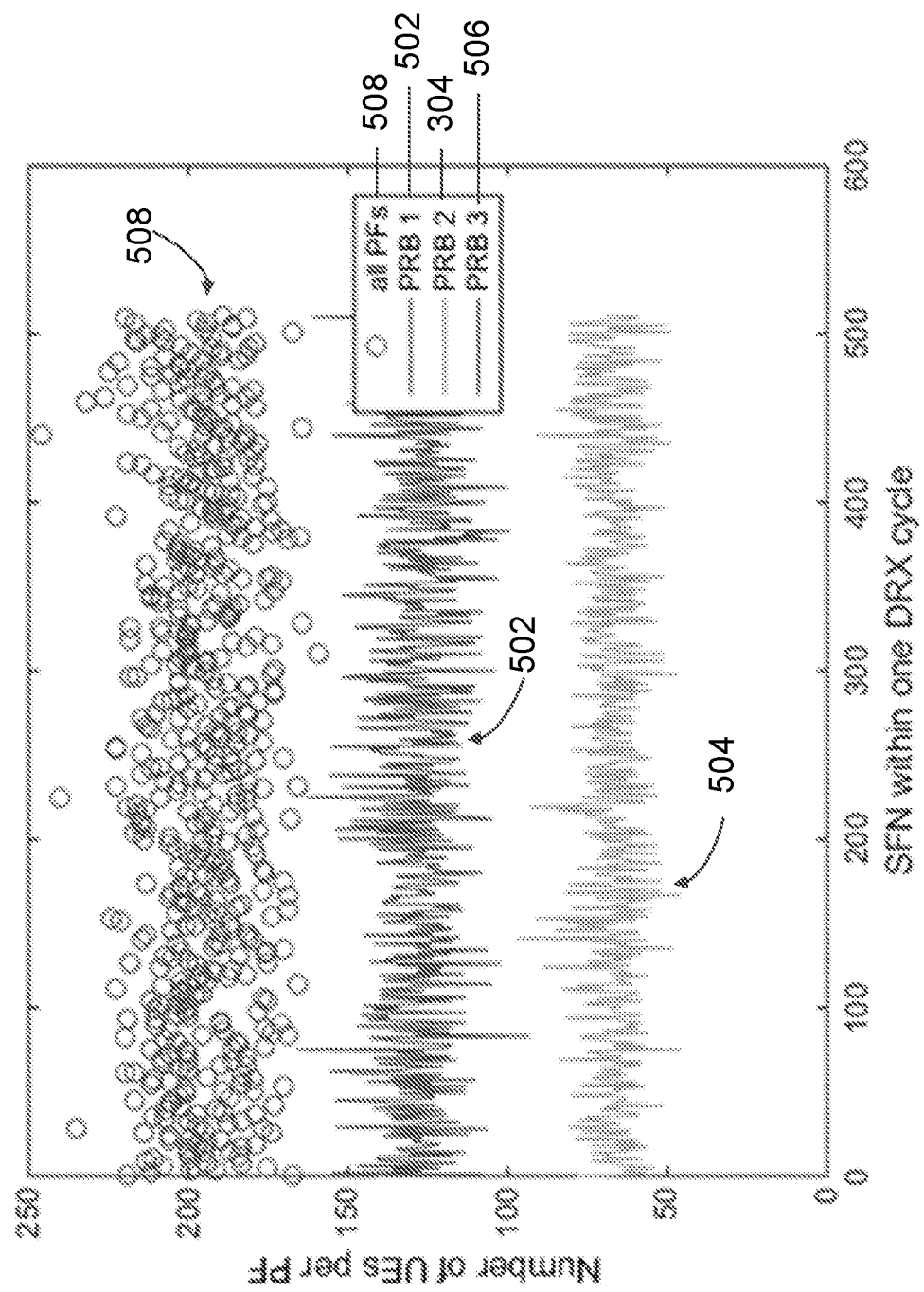
FIG. 5 is another schematic diagram showing UE distribution over paging frames, according to certain embodiments of the present disclosure.

FIG. 5 is another schematic diagram showing UE distribution according to certain embodiments of the present disclosure. The graph illustrates an example of uneven distribution of UEs over three paging PRBs. Circles 508 represent the total number of UEs on all paging frames, graph line 502 represents the number of UEs assigned to PRB 1, graph line 504 represents the number of UEs assigned to PRB 2, and graph line 506 represents the number of UEs assigned to PRB 3. In this example, PRB3 has low enough priority that it is not used by any UE, and thus its value is zero in the figure.

The same weight and parameter values are used as in the previous examples. Example Matlab code may comprise the following:

```
NB=mod(floor(UE_ID/(N)),Nn);
prio=[2,0.5,1];                      %Nn=3
P=prio./sum(prio)*sum(length(prio))%Prio in
   interval (0,2]
PNBvikt=PNB;
for j=1:length(UE_ID)
    B=zeros(1,Nn);
    B(floor(mod((UE_ID(j)/(N)),Nn)) +1)=1;
    p2=prio/sum(prio);
    WeightedPNB=p2+B*2/3;
    for k=1:length(B)
    rng(UE_ID(k)+k)              %different random
         number per PNB
         randPNB(k)=WeightedPNB(k)+1*rand(1);
    end
    [maxvalue,pnb]=max(randPNB);
    PNBvikt(j)=pnb-1;            %Enumrerate PRBs
       from 0
end
```

The examples and embodiments described above may be represented generally by the flow diagrams in FIGS. 6-9.

Figure 6:
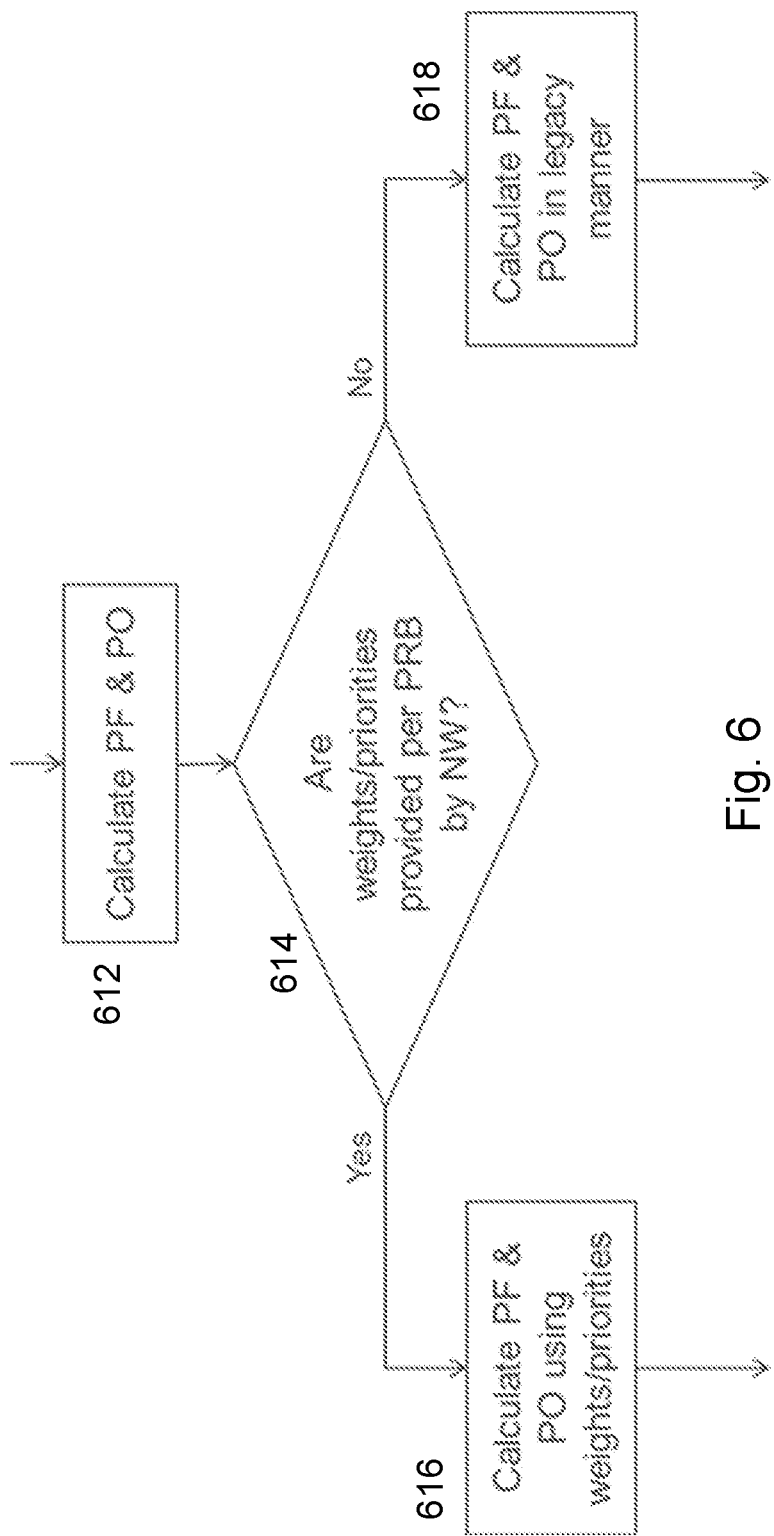
FIG. 6 is a process flow diagram for an example method performed by a wireless device in accordance with certain embodiments of the present disclosure.

FIG. 6 is a process flow diagram for an example method performed by a wireless device in accordance with certain embodiments of the present disclosure. In particular embodiments, one or more steps of FIG. 6 may be performed by wireless device 210 of the wireless network described with respect to FIG. 1.

The method begins at step 612, where a wireless device determines that it needs to calculate a paging frame (PF) and paging occasion (PO). For example, to wake up and monitor PDCCH for paging messages, wireless device 210 needs to calculate its paging frame and paging opportunity.

At step 614, the wireless device determines whether weights or priorities are provided for each potential paging PRB. In some embodiments, the network node sends the weights or priorities to the wireless device. For example, wireless device 210 may receive weights from network node 200 broadcast in the system information.

If the wireless device determines weights or priorities are provided, then the method continues to step 616 where the wireless device calculates the PF and PO using the weights and priorities. For example, wireless device 210 may calculate the PF and PO according to any of the embodiments or examples described above.

If the wireless device determines weights or priorities are not provided, then the method continues to step 618 where the wireless device calculates the PF and PO using a conventional formula, such as an LTE Release 13 formula. For example, wireless device 210 may calculate the PF and PO according to an even distribution function.

Modifications, additions, or omissions may be made to method of FIG. 6. Additionally, one or more steps in the method of FIG. 6 may be performed in parallel or in any suitable order. The steps of the method may be repeated over time as necessary.

Figure 7:
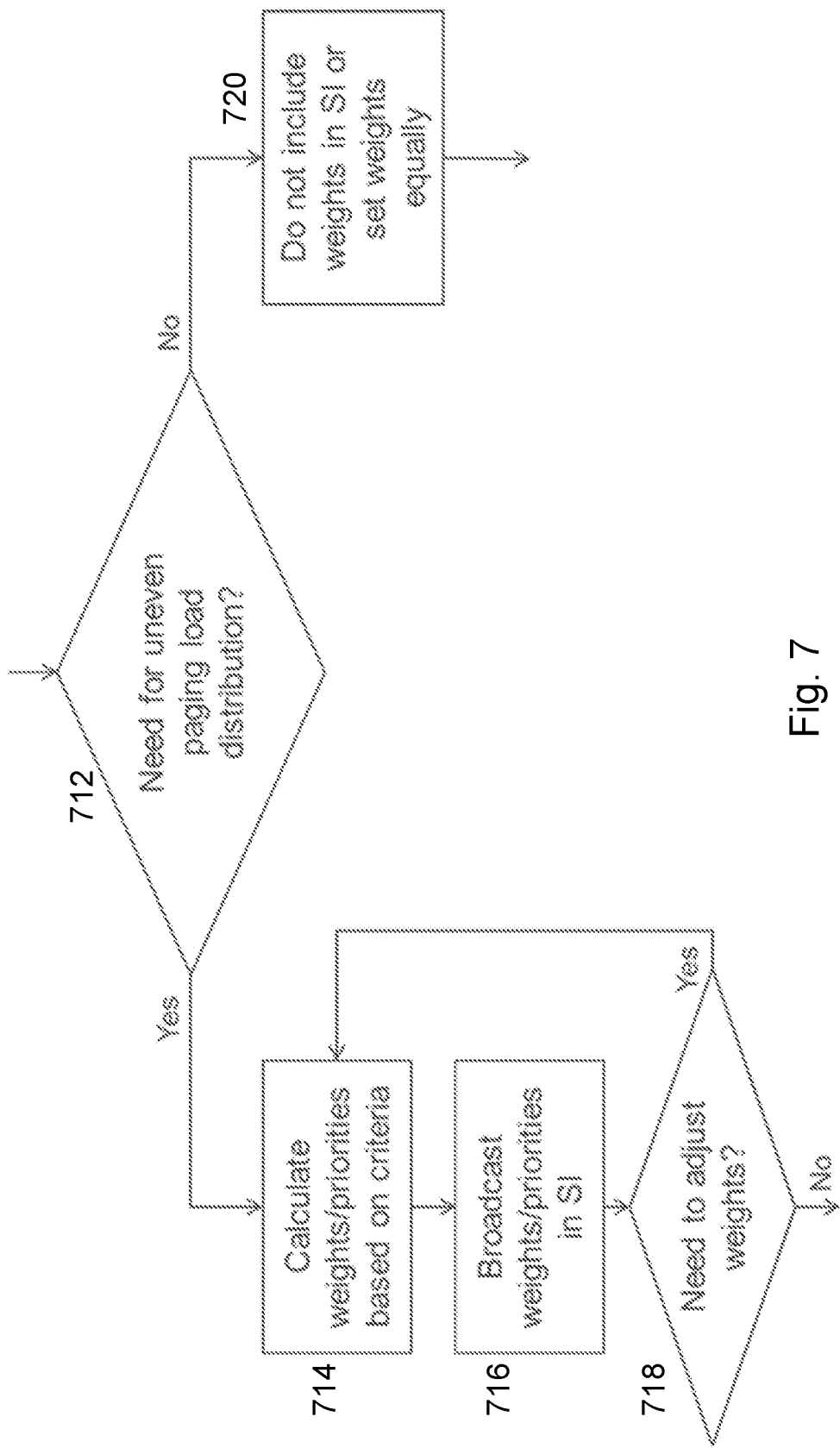
FIG. 7 is a process flow diagram for an example method performed by a network node in accordance with certain embodiments of the present disclosure.

FIG. 7 is a process flow diagram for an example method performed by a network node in accordance with certain embodiments of the present disclosure. In particular embodiments, one or more steps of FIG. 7 may be performed by network node 200 of the wireless network described with respect to FIG. 1.

The method begins at step 712, where a network node determines the network may benefit from an uneven paging load distribution. For example, network node 200 may determine the network includes a significant number of Release 13 wireless devices all assigned to the same paging PRB. Network node 200 may determine that unevenly distributing a number of Release 14 wireless devices may compensate for the concentration of Release 13 wireless devices.

If the network node determines there is not a need for an uneven paging load distribution, the method continues to step 720 where the network node does not include weight in the system information, or includes equal weights in the system information.

If the network node determines there is a need for an uneven paging load distribution, the method continues to step 714. At step 714, the network node determines or obtains weights or priorities based on any of the criteria described with respect to the embodiments and examples above.

At step 716, the network node broadcasts the weights or priorities in the system information. For example, network node 200 may broadcast weights or priorities for each paging PRB using SIB2.

In particular embodiments, the RadioResourceConfig-Common for the PCCH-configuration contained in SIB2 may include the following elements:

```
PCCH-Config-NB-v1410 ::=            SEQUENCE
{
    PRB-List-r14 ::=                SEQUENCE
    (SIZE (1.. Nnb)) OF PRB-r14
}
PRB-r14 ::=                         SEQUENCE
{
    PRB-weight
       ENUMERATED {1, 2, 3, 4, 5}
       OPTIONAL, -- Need OP
}
```

In particular embodiments, the PRB-weight may refer to a weight for the PRB for uneven load distribution between PRBs given in values 1 to 5. A default value may be 3 if the IE is not present.

At step 718, the network node determines whether to adjust the weights. For example, after some time the status of the network may change as wireless devices come and go. The network node may determine to adjust the weights assigned to particular paging PRBs to account for the changes in the network, and may return to step 714. In this way, particular embodiments may include an optional feedback-loop to update the PRB weights to ensure the desired load distribution.

Modifications, additions, or omissions may be made to method of FIG. 7. Additionally, one or more steps in the method of FIG. 7 may be performed in parallel or in any suitable order. The steps of the method may be repeated over time as necessary.

Figure 8:
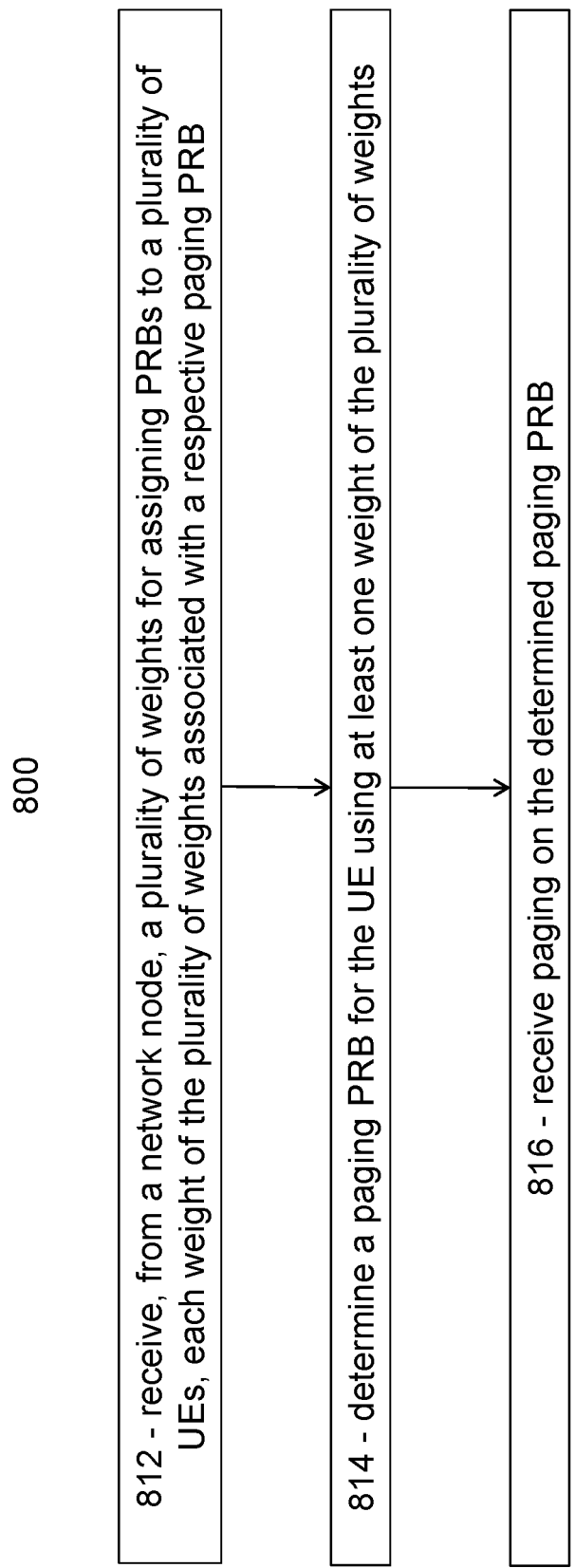
FIG. 8 is another process flow diagram for an example method performed by a wireless device in accordance with certain embodiments of the present disclosure.

FIG. 8 is another process flow diagram for an example method performed by a wireless device in accordance with certain embodiments of the present disclosure. In particular embodiments, one or more steps of FIG. 8 may be performed by wireless device 210 of the wireless network described with respect to FIG. 1.

The method begins at step 812, where a wireless device receives a plurality of weights for assigning paging PRBs to a plurality of UEs. Each weight is associated with a respective paging PRB. In particular embodiments, the wireless device may receive the plurality of weights from a network node. The plurality of weights may be broadcast in the system information. For example, wireless device 210 may receive a plurality of weights broadcast from network node 200 in SIB2.

In particular embodiments, the weights may be based on any of the criteria described in the embodiments and examples above. For example, the weights may be based on at least one of the following: whether a PRB is an anchor PRB; a paging load or paging blocking probability; downlink traffic load; a number of anchor PRBs; a discontinuous reception (DRX) parameter; and a distribution of UEs according to their LTE release version.

At step 814, the wireless device determines a paging PRB for the UE using at least one weight of the plurality of weights. For example, wireless device 210 may determine its own paging PRB using its own UE identifier and the plurality of weights.

In particular embodiments, the wireless device may determine the paging PRB according to any of the embodiments or examples described above, such as those described with respect to FIGS. 2-5. For example, determining the paging PRB for the UE may comprise assigning the UE to an artificial paging PRB of a set of artificial paging PRBs (e.g., using equations (1) or (2) described above), and mapping the artificial paging PRB to an actual paging PRB of a set of actual paging PRBs using at least one weight of the plurality of weights (e.g., using the mapping vectors described above). The set of actual paging PRBs includes a smaller number of paging PRBs than the set of artificial paging PRBs.

In particular embodiments, the UE is associated with a unique identifier. Assigning the UE to the artificial paging PRB comprises using an even distribution function to select the artificial paging PRB. The even distribution function comprises dividing the unique identifier by a total number of paging PRBs in the set of artificial paging PRBs. Mapping the artificial paging PRB to the actual paging PRB comprises using an uneven distribution function to select the actual paging PRB. The uneven distribution function comprises assigning a number of paging PRBs of the set of artificial paging PRBs to the paging PRBs of the set of actual paging PRBs according to the weights.

At step 814, the wireless device receives paging on the determined paging PRB. For example, wireless device 210 may wake up and monitor the paging PRB for a paging message. Wireless device 210 may receive a paging message from network node 200.

Modifications, additions, or omissions may be made to method of FIG. 8. Additionally, one or more steps in the method of FIG. 8 may be performed in parallel or in any suitable order. The steps of the method may be repeated over time as necessary.

Figure 9:
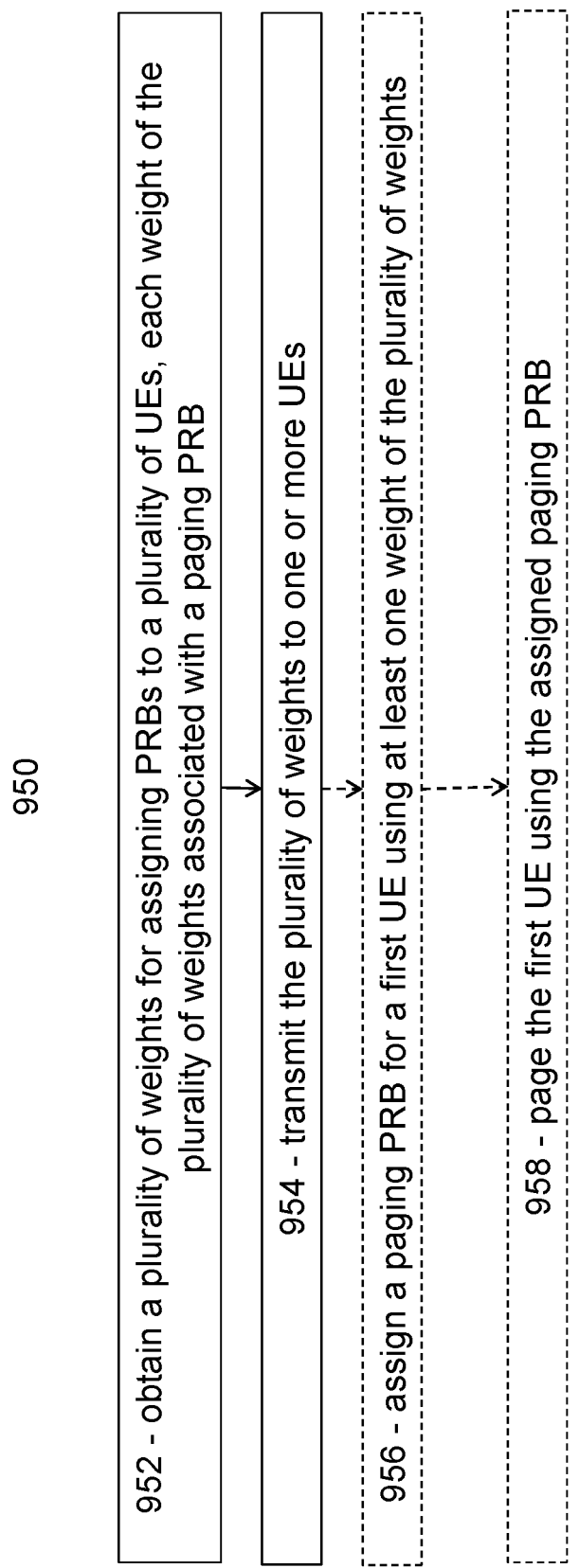
FIG. 9 is another process flow diagram for an example method performed by a network node in accordance with certain embodiments of the present disclosure.

FIG. 9 is another process flow diagram for an example method performed by a network node in accordance with certain embodiments of the present disclosure. The method assigns PRBs to a plurality of UEs to unevenly distribute a paging load to balance an existing paging load in a wireless network. In particular embodiments, one or more steps of FIG. 9 may be performed by network node 200 of the wireless network described with respect to FIG. 1.

The method begins at step 952, where a network node obtains a plurality of weights for assigning paging PRBs to a plurality of UEs. Each weight of the plurality of weights is associated with a respective paging PRB. In particular embodiments, obtaining the plurality of weights may comprise the network node determining (e.g., calculating) the weights. In some embodiments, the network node may obtain the weights from another network element, or the weights may be provisioned by a network operator. For example, network node 200 may calculate the weights according to any of the embodiments or examples described above.

In particular embodiments, the weights may be based on at least one of the following: whether a PRB is an anchor PRB; a paging load or paging blocking probability; downlink traffic load; a number of anchor PRBs; a DRX parameter; and a distribution of UEs according to their LTE release version.

At step 954, the network node transmits the plurality of weights to one or more UEs. For example, network node 200 may broadcast the weights to a plurality of wireless devices 210 using system information.

The network node may send a paging message to a wireless device. To send the paging message, the network node needs to know the paging PRB to use for a particular wireless device. The network node may optionally perform the following steps to send a paging message to a particular wireless device.

At step 956, the network node assigns a paging PRB for a UE using at least one weight of the plurality of weights. In particular embodiments, assigning the paging PRB for the UE may comprise assigning the UE to an artificial paging PRB of a set of artificial paging PRBs, and mapping the artificial paging PRB to an actual paging PRB of a set of actual paging PRBs using at least one weight of the plurality of weights. The set of actual paging PRBs includes a smaller number of paging PRBs than the set of artificial paging PRBs.

In particular embodiments, the paging PRB for the UE may comprise assigning the UE to an artificial paging PRB of a set of artificial paging PRBs, and mapping the artificial paging PRB to an actual paging PRB of a set of actual paging PRBs using at least one weight of the plurality of weights. The set of actual paging PRBs includes a smaller number of paging PRBs than the set of artificial paging PRBs.

In particular embodiments, the UE is associated with a unique identifier. Assigning the UE to the artificial paging PRB comprises using an even distribution function to select the artificial paging PRB. The even distribution function comprises dividing the unique identifier by a total number of paging PRBs in the set of artificial paging PRBs. Mapping the artificial paging PRB to the actual paging PRB comprises using an uneven distribution function to select the actual paging PRB. The uneven distribution function comprises assigning a number of paging PRBs of the set of artificial paging PRBs to the paging PRBs of the set of actual paging PRBs according to the weights.

In particular embodiments, assigning a paging PRB to the UE comprises steps similar to those described with respect to step 814 of FIG. 8. In this way, both the network node and the wireless device calculate (or determine) the same paging PRB so that the wireless device is listening on the same paging PRB that the network node is using for transmission.

At step 958, the network node pages the UE using the assigned paging PRB. For example, network node 200 may page wireless device 210 using the paging PRB assigned in step 956.

Modifications, additions, or omissions may be made to method of FIG. 9. Additionally, one or more steps in the method of FIG. 9 may be performed in parallel or in any suitable order. The steps of the method may be repeated over time as necessary.

Figure 10B:
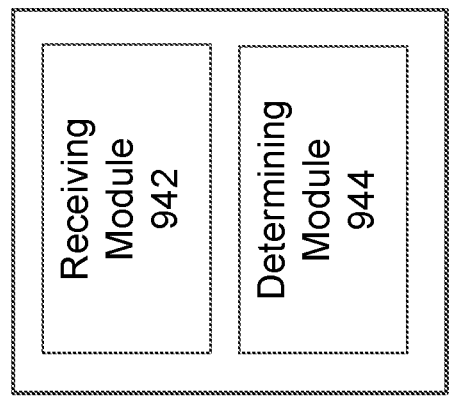
FIG. 10B is a block diagram illustrating example components of a wireless device.
Figure 10A:
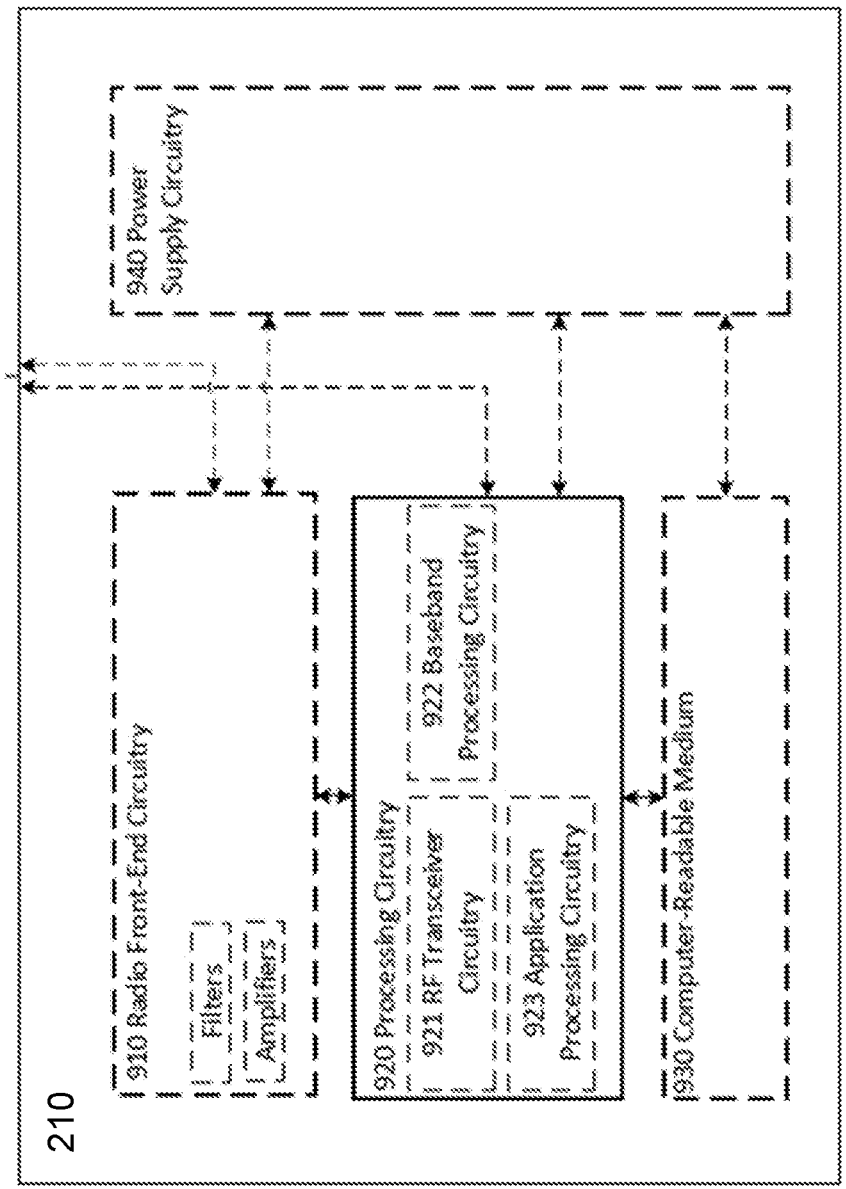
FIG. 10A is a block diagram illustrating an example embodiment of a wireless device.

FIG. 10A is a block diagram illustrating an example embodiment of a wireless device. An example wireless device 210 includes an antenna 905, radio front-end circuitry 910, processing circuitry 920, and a computer-readable storage medium 930. Antenna 905 may include one or more antennas or antenna arrays, and is configured to send and/or receive wireless signals, and is connected to radio front-end circuitry 910. In certain alternative embodiments, wireless device 210 may not include antenna 905, and antenna 905 may instead be separate from wireless device 210 and be connectable to wireless device 210 through an interface or port.

The radio front-end circuitry 910 may comprise various filters and amplifiers, is connected to antenna 905 and processing circuitry 920, and is configured to condition signals communicated between antenna 905 and processing circuitry 920. In certain alternative embodiments, wireless device 900 may not include radio front-end circuitry 910, and processing circuitry 920 may instead be connected to antenna 905 without radio front-end circuitry 910.

Processing circuitry 920 may include one or more of radio frequency (RF) transceiver circuitry 921, baseband processing circuitry 922, and application processing circuitry 923. In some embodiments, the RF transceiver circuitry 921, baseband processing circuitry 922, and application processing circuitry 923 may be on separate chipsets. In alternative embodiments, part or all of the baseband processing circuitry 922 and application processing circuitry 923 may be combined into one chipset, and the RF transceiver circuitry 921 may be on a separate chipset. In still alternative embodiments, part or all of the RF transceiver circuitry 921 and baseband processing circuitry 922 may be on the same chipset, and the application processing circuitry 923 may be on a separate chipset. In yet other alternative embodiments, part or all of the RF transceiver circuitry 921, baseband processing circuitry 922, and application processing circuitry 923 may be combined in the same chipset. Processing circuitry 920 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 920 executing instructions stored on a computer-readable storage medium 930, as shown in FIG. 10A. In alternative embodiments, some or all of the functionality may be provided by the processing circuitry 920 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 920 alone or to other components of the wireless device, but are enjoyed by the wireless device as a whole, and/or by end users and the wireless network generally.

Antenna 905, radio front-end circuitry 910, and/or processing circuitry 920 may be configured to perform any receiving operations described herein as being performed by a wireless device. Any information, data and/or signals may be received from a network equipment and/or another wireless device.

The processing circuitry 920 may be configured to perform any determining operations described herein as being performed by a wireless device. Determining as performed by processing circuitry 920 may include processing information obtained by the processing circuitry 920 by, for example, converting the obtained information into other information, comparing the obtained information or converted information to information stored in the wireless device, and/or performing one or more operations based on the obtained information or converted information, and as a result of said processing making a determination.

Antenna 905, radio front-end circuitry 910, and/or processing circuitry 920 may be configured to perform any transmitting operations described herein as being performed by a wireless device. Any information, data and/or signals may be transmitted to a network equipment and/or another wireless device.

Computer-readable storage medium 930 is generally operable to store instructions, such as a computer program, software, an application including one or more of logic, rules, code, tables, etc. and/or other instructions capable of being executed by a processor. Examples of computer-readable storage medium 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 920. In some embodiments, processing circuitry 920 and computer-readable storage medium 930 may be considered to be integrated.

Alternative embodiments of the wireless device 210 may include additional components beyond those shown in FIG. 10A that may be responsible for providing certain aspects of the wireless device's functionality, including any of the functionality described herein and/or any functionality necessary to support the solution described above. As just one example, wireless device 210 may include input interfaces, devices and circuits, and output interfaces, devices and circuits.

Input interfaces, devices, and circuits are configured to allow input of information into wireless device 210, and are connected to processing circuitry 920 to allow processing circuitry 920 to process the input information. For example, input interfaces, devices, and circuits may include a microphone, a proximity or other sensor, keys/buttons, a touch display, one or more cameras, a USB port, or other input elements.

Output interfaces, devices, and circuits are configured to allow output of information from wireless device 210, and are connected to processing circuitry 920 to allow processing circuitry 920 to output information from wireless device 900. For example, output interfaces, devices, or circuits may include a speaker, a display, vibrating circuitry, a USB port, a headphone interface, or other output elements. Using one or more input and output interfaces, devices, and circuits, wireless device 210 may communicate with end users and/or the wireless network, and allow them to benefit from the functionality described herein.

As another example, wireless device 210 may include power supply circuitry 940. The power supply circuitry 940 may comprise power management circuitry. The power supply circuitry may receive power from a power source, which may either be comprised in, or be external to, power supply circuitry 940. For example, wireless device 210 may comprise a power source in the form of a battery or battery pack which is connected to, or integrated in, power supply circuitry 940. Other types of power sources, such as photovoltaic devices, may also be used. As a further example, wireless device 210 may be connectable to an external power source (such as an electricity outlet) via an input circuitry or interface such as an electrical cable, whereby the external power source supplies power to power supply circuitry 940.

Power supply circuitry 940 may be connected to radio front-end circuitry 910, processing circuitry 920, and/or computer-readable storage medium 930 and be configured to supply wireless device 210, including processing circuitry 920, with power for performing the functionality described herein.

Wireless device 20 may also include multiple sets of processing circuitry 920, computer-readable storage medium 930, radio circuitry 910, and/or antenna 905 for different wireless technologies integrated into wireless device 900, such as, for example, GSM, WCDMA, LTE, NR, WiFi, or Bluetooth wireless technologies. These wireless technologies may be integrated into the same or different chipsets and other components within wireless device 210.

FIG. 10B is a block diagram illustrating example components of a wireless device. The components may include receiving module 942 and determining module 944.

Receiving module 942 may perform the receiving functions of wireless device 210. For example, receiving module 942 may receive a plurality of weights each associated with a respective paging PRB from a network node. Receiving module 942 may receive a paging message from a network node. Receiving module 942 may perform the receiving functions described in any of the examples and embodiments described above. In certain embodiments, receiving module 942 may include or be included in processing circuitry 920. In particular embodiments, receiving module 942 may communicate with determining module 944.

Determining module 944 may perform the determining functions of wireless device 210. For example, determining module 944 may determine a paging PRB for a wireless device according to any of the embodiments or examples described above. In certain embodiments, determining module 944 may include or be included in processing circuitry 920. In particular embodiments, determining module 944 may communicate with receiving module 942.

FIG. 11A is a block diagram illustrating an example embodiment of a network node. An example radio network node 200 includes an antenna 1040, radio circuitry (e.g. radio front-end circuitry) 1010, processing circuitry 1020, and the radio network node 200 may also include a memory 1030. The memory 1030 may be separate from the processing circuitry 1020 or an integral part of processing circuitry 1020. Antenna 1040 may include one or more antennas or antenna arrays, and is configured to send and/or receive wireless signals, and is connected to radio circuitry (e.g. radio front-end circuitry) 1010. In certain alternative embodiments, radio network node 200 may not include antenna 1040, and antenna 1040 may instead be separate from radio network node 200 and be connectable to radio network node 200 through an interface or port. The processing circuitry 1020 may be configured to determine, obtain, and/or calculate weights associated with paging PRBs and assign a paging PRB to a wireless device using the weights.

The radio circuitry (e.g. radio front-end circuitry) 1010 may comprise various filters and amplifiers, is connected to antenna 1040 and processing circuitry 1020, and is configured to condition signals communicated between antenna 1040 and processing circuitry 1020. In certain alternative embodiments, radio network node 200 may not include radio circuitry (e.g. radio front-end circuitry) 1010, and processing circuitry 1020 may instead be connected to antenna 1040 without front-end circuitry 1010. The radio circuitry 1010 may be configured to transmit a system information and paging messages. The radio circuitry 1010 may be configured to transmit control information to a UE in accordance with the transmitted signal.

Processing circuitry 1020 may include one or more of radio frequency (RF) transceiver circuitry, baseband processing circuitry, and application processing circuitry. In some embodiments, the RF transceiver circuitry 1021, baseband processing circuitry 1022, and application processing circuitry 1023 may be on separate chipsets. In alternative embodiments, part or all of the baseband processing circuitry 1022 and application processing circuitry 1023 may be combined into one chipset, and the RF transceiver circuitry 1021 may be on a separate chipset. In still alternative embodiments, part or all of the RF transceiver circuitry 1021 and baseband processing circuitry 1022 may be on the same chipset, and the application processing circuitry 1023 may be on a separate chipset. In yet other alternative embodiments, part or all of the RF transceiver circuitry 1021, baseband processing circuitry 1022, and application processing circuitry 1023 may be combined in the same chipset. Processing circuitry 1020 may include, for example, one or more central processing units (CPUs), one or more microprocessors, one or more application specific integrated circuits (ASICs), and/or one or more field programmable gate arrays (FPGAs).

The radio network node 200 may include a power source 1050. The power source 1050 may be a battery or other power supply circuitry, as well as power management circuitry. The power supply circuitry may receive power from an external source. A battery, other power supply circuitry, and/or power management circuitry are connected to radio circuitry (e.g. radio front-end circuitry) 1010, processing circuitry 1020, and/or memory 1030. The power source 1050, battery, power supply circuitry, and/or power management circuitry are configured to supply radio network node 200, including processing circuitry 1020, with power for performing the functionality described herein.

FIG. 11B is a block diagram illustrating example components of a network node. The components may include obtaining module 1060, transmitting module 1062, and determining module 1064.

Obtaining module 1060 may perform the obtaining functions of network node 200. For example, obtaining module 1060 may obtain a plurality of weights each for a respective paging PRB. In certain embodiments, obtaining module 1060 may include or be included in processing circuitry 1020. In particular embodiments, obtaining module 1060 may communicate with transmitting module 1062 and determining module 1064.

Transmitting module 1062 may perform the transmitting functions of network node 200. For example, transmitting module 1062 may transmit a plurality of weights and/or a paging message to a wireless device. In certain embodiments, transmitting module 1062 may include or be included in processing circuitry 1020. In particular embodiments, transmitting module 1062 may communicate with obtaining module 1060 and determining module 1064.

Determining module 1064 may perform the determining functions of network node 200. For example, determining module 1064 may determine a plurality of weights for paging PRBs and may assign a paging PRB to a wireless device based on the weights. In certain embodiments, determining module 1064 may include or be included in processing circuitry 1020. In particular embodiments, determining module 1064 may communicate with obtaining module 1060 and transmitting module 1062.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:

| | |
|---|---|
| 3GPP | Third Generation Partnership Project |
| BTS | Base Transceiver Station |
| CRS | Cell Reference Symbols |
| D2D | Device to Device |
| DCF | Distributed Coordination Function |
| DL | Downlink |
| eNB | eNodeB |
| FDD | Frequency Division Duplex |
| LTE | Long Term Evolution |
| MAC | Medium Access Control |
| MBSFN | Multimedia Broadcast Single Frequency Network |
| M2M | Machine to Machine |
| MIB | Master Information Block |
| MIMO | Multi-Input Multi-Output |
| MTC | Machine Type Communication |
| NB | Narrowband |
| NB-IoT | NB Internet of Things |
| NDLSCH | NB Downlink Shared Channel |
| NPBCH | NB Physical Broadcast Channel |
| NPRACH | NB Physical Random Access Channel |
| NPSS | NB Primary Synchronization Signal |
| NR | New Radio |
| NRS | NB Reference Symbols |
| NSSS | NB Secondary Synchronization Signal |
| PDSCH | Physical Downlink Shared Channel |
| PUCCH | Physical Uplink Control Channel |
| PO | Paging occasion |
| PF | Paging frame |
| PRB | Physical Resource Block |
| RAN | Radio Access Network |
| RAT | Radio Access Technology |
| RB | Radio Bearer |
| RBS | Radio Base Station |
| RNC | Radio Network Controller |
| RRC | Radio Resource Control |
| RRH | Remote Radio Head |
| RRU | Remote Radio Unit |
| SI | System Information |
| SIB | System Information Block |
| TDD | Time Division Duplex |
| UE | User Equipment |
| UL | Uplink |
| UTRAN | Universal Terrestrial Radio Access Network |
| WAN | Wireless Access Network |

The invention claimed is:

1. A method for use in a user equipment (UE), the method comprising:
   receiving, from a network node, a plurality of weights for assigning paging physical resource blocks (PRBs) to a plurality of UEs, each weight of the plurality of weights associated with a respective paging PRB;
   determining a paging PRB for the UE using at least one weight of the plurality of weights; and
   receiving paging on the determined paging PRB;
   wherein the UE is associated with a unique identifier; and
   wherein determining the paging PRB for the UE comprises:
      assigning the UE to an artificial paging PRB of a set of artificial paging PRBs, wherein assigning the UE to the artificial paging PRB comprises using an even distribution function to select the artificial paging PRB, the even distribution function comprising dividing the unique identifier by a total number of paging PRBs in the set of artificial paging PRBs; and
      mapping the artificial paging PRB to an actual paging PRB of a set of actual paging PRBs using at least one weight of the plurality of weights, the set of actual paging PRBs including a smaller number of paging PRBs than the set of artificial paging PRBs, wherein mapping the artificial paging PRB to the actual paging PRB comprises using an uneven distribution function to select the actual paging PRB, the uneven distribution function comprising assigning a number of paging PRBs of the set of artificial paging PRBs to the paging PRBs of the set of actual paging PRBs according to the weights.

2. The method of claim 1, wherein the total number of paging PRBs in the set of artificial paging PRBs is equal to a sum of the plurality of weights.

3. The method of claim 1, wherein receiving the plurality of weights comprises receiving broadcast system information.

4. The method of claim 1, wherein the weights are based on at least one of the following:
   whether a PRB is an anchor PRB;
   a paging load or paging blocking probability;

downlink traffic load;
a number of anchor PRBs;
a discontinuous reception (DRX) parameter; and
a distribution of UEs according to their long term evolution (LTE) release version.

5. A user equipment (UE) comprising a memory coupled to processing circuitry the processing circuitry operable to:
receive, from a network node a plurality of weights for assigning paging physical resource blocks (PRBs) to a plurality of UEs, each weight of the plurality of weights associated with a respective paging PRB;
determine a paging PRB for the UE using at least one weight of the plurality of weights; and
receive paging on the determined paging PRB;
wherein the UE is associated with a unique identifier;
wherein the processing circuitry is operable to assign the UE to an artificial paging PRB of a set of artificial paging PRBs by using an even distribution function to select the artificial paging PRB, the even distribution function comprising dividing the unique identifier by a total number of paging PRBs in the set of artificial paging PRBs; and
wherein the processing circuitry is operable to map the artificial paging PRB to an actual paging PRB of a set of actual paging PRBs using at least one weight of the plurality of weights, the set of actual paging PRBs including a smaller number of paging PRBs than the set of artificial paging PRBs, wherein mapping the artificial paging PRB to the actual paging PRB comprises using an uneven distribution function to select the actual paging PRB, the uneven distribution function comprising assigning a number of paging PRBs of the set of artificial paging PRBs to the paging PRBs of the set of actual paging PRBs according to the weights.

6. The UE of claim 5, wherein the total number of paging PRBs in the set of artificial paging PRBs is equal to a sum of the plurality of weights.

7. The UE of claim 5, wherein the processing circuitry is operable to receive the plurality of weights by receiving broadcast system information.

8. The UE of claim 5, wherein the weights are based on at least one of the following:
whether a PRB is an anchor PRB;
a paging load or paging blocking probability;
downlink traffic load;
a number of anchor PRBs;
a discontinuous reception (DRX) parameter; and
a distribution of UEs according to their long term evolution (LTE) release version.

9. A method for use in a network node of assigning paging physical resource blocks (PRBs) to a plurality of user equipment (UEs) to unevenly distribute a paging load to balance an existing paging load in a wireless network, the method comprising:
obtaining a plurality of weights for assigning paging PRBs to a plurality of UEs, wherein each weight of the plurality of weights is associated with a respective paging PRB and the plurality of weights unevenly assign UEs to paging PRBs to unevenly distribute a paging load;
transmitting the plurality of weights to one or more UEs;
assigning a paging PRB for a UE of the plurality of UEs using at least one weight of the plurality of weights; and
paging the UE using the assigned paging PRB;
wherein the UE is associated with a unique identifier;
wherein assigning the paging PRB for the UE comprises:
assigning the UE to an artificial paging PRB of a set of artificial paging PRBs using an even distribution function to select the artificial paging PRB, the even distribution function comprising dividing the unique identifier by a total number of paging PRBs in the set of artificial paging PRBs; and
mapping the artificial paging PRB to an actual paging PRB of a set of actual paging PRBs using at least one weight of the plurality of weights, the set of actual paging PRBs including a smaller number of paging PRBs than the set of artificial paging PRBs, wherein mapping the artificial paging PRB to the actual paging PRB comprises using an uneven distribution function to select the paging PRB, the uneven distribution function comprising assigning a number of paging PRBs of the set of artificial paging PRBs to the paging PRBs of the set of actual paging PRBs according to the weights.

10. The method of claim 9, wherein obtaining the plurality of weights comprises the network node determining the weights.

11. The method of claim 9, wherein the weights are based on at least one of the following:
whether a PRB is an anchor PRB;
a paging load or paging blocking probability;
downlink traffic load;
a number of anchor PRBs;
a discontinuous reception (DRX) parameter; and
a distribution of UEs according to their long term evolution (LTE) release version.

12. The method of claim 9, wherein transmitting the plurality of weights comprises broadcasting system information.

13. The method of claim 9, wherein the total number of paging PRBs in the set of artificial paging PRBs is equal to a sum of the plurality of weights.

14. A network node comprising a memory coupled to processing circuitry the network node capable of assigning paging physical resource blocks (PRBs) to a plurality of user equipment (UEs) to unevenly distribute a paging load to balance an existing paging load in a wireless network, the processing circuitry operable to:
obtain a plurality of weights for assigning paging PRBs to a plurality of UEs wherein each weight of the plurality of weights is associated with a respective paging PRB and the plurality of weights unevenly assign UEs to paging PRBs to unevenly distribute a paging load;
transmit the plurality of weights to one or more UEs;
assign a paging PRB for a UE of the plurality of UEs using at least one weight of the plurality of weights; and
page the UE using the assigned paging PRB
wherein the UE is associated with a unique identifier;
wherein the processing circuitry is operable to assign the paging PRB for the UE by:
assigning the UE to an artificial paging PRB of a set of artificial paging PRBs by using an even distribution function to select the artificial paging PRB, the even distribution function comprising dividing the unique identifier by a total number of paging PRBs in the set of artificial PRBs; and
mapping the artificial paging PRB to an actual paging PRB of a set of actual paging PRBs using at least one weight of the plurality of weights, the set of actual paging PRBs including a smaller number of paging PRBs than the set of artificial paging PRBs, wherein mapping the artificial paging PRB to the actual paging PRB comprises using an uneven distribution function to select the paging PRB, the uneven distribution function comprising assigning a number of paging PRBs of the set of artificial paging PRBs to the paging PRBs of the set of actual paging PRBs according to the weights.

15. The network node of claim 14, wherein the processing circuitry is operable to obtain the plurality of weights by determining the weights.

16. The network node of claim 14, wherein the weights are based on at least one of the following:
   whether a PRB is an anchor PRB;
   a paging load or paging blocking probability;
   downlink traffic load;
   a number of anchor PRBs;
   a discontinuous reception (DRX) parameter; and
   a distribution of UEs according to their long term evolution (LTE) release version.

17. The network node of claim 14, wherein the processing circuitry is operable to transmit the plurality of weights by broadcasting system information.

18. The network node of claim 14, wherein the total number of paging PRBs in the set of artificial paging PRBs is equal to a sum of the plurality of weights.

* * * * *